United States Patent
Rice et al.

(10) Patent No.: US 7,367,362 B2
(45) Date of Patent: May 6, 2008

(54) SYSTEM AND METHOD FOR PIPE REPAIR

(75) Inventors: Brian L. Rice, Perkiomenville, PA (US); Henry E. Topf, Jr., Wellsboro, PA (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 11/647,855

(22) Filed: Dec. 29, 2006

(65) Prior Publication Data
US 2007/0107791 A1 May 17, 2007

Related U.S. Application Data

(63) Continuation-in-part of application No. 11/003,199, filed on Dec. 3, 2004.

(51) Int. Cl.
*F16L 55/16* (2006.01)

(52) U.S. Cl. .......................... 138/99; 138/97; 138/172; 156/53

(58) Field of Classification Search ............ 138/99, 138/172, 97, 129, 178, DIG. 7, DIG. 2; 285/15; 156/48, 53
See application file for complete search history.

(56) References Cited

U.S. PATENT DOCUMENTS

| | | | | |
|---|---|---|---|---|
| RE12,703 E | * | 10/1907 | Oorcoran ..................... | 249/90 |
| 2,492,507 A | * | 12/1949 | Tipton .......................... | 138/99 |
| 2,924,546 A | | 2/1960 | Shaw ........................... | 156/94 |
| 3,228,712 A | * | 1/1966 | Hausmann et al. ............ | 285/45 |
| 3,350,050 A | * | 10/1967 | Buczala et al. ............... | 249/89 |
| 3,563,276 A | * | 2/1971 | High et al. .................... | 138/99 |
| 3,907,004 A | | 9/1975 | Yamaguchi et al. ......... | 138/132 |
| 4,559,974 A | | 12/1985 | Fawley et al. .............. | 138/172 |
| 5,027,862 A | * | 7/1991 | Laybourn ..................... | 138/99 |
| 5,201,600 A | | 4/1993 | Topf, Jr. et al. .............. | 404/25 |

(Continued)

FOREIGN PATENT DOCUMENTS

CA          1030714          9/1978

(Continued)

OTHER PUBLICATIONS

Boreman, David J., et al., Repair Technologies for Gas Transmission Pipelines, Pipeline & Gas Journal; 227, 3; ABI/INFORM Trade and Industry, pp. 46-51, Mar. 2000.

(Continued)

*Primary Examiner*—Patrick F. Brinson
(74) *Attorney, Agent, or Firm*—Fletcher Yoder

(57) ABSTRACT

A system and method of repairing a pipe including securing a reinforcing material, such as a dry fiber structure (e.g., a carbon fibers) to the surface of the pipe. A polymeric material is placed on top of the reinforcing material, self-penetrating the dry fiber structure. The polymeric material substantially saturates the reinforcing material and cures to form a reinforced polymeric composite which may increase or restore the pressure rating or operating pressure capacity of the pipe. Optionally, an outer containment component, such as a sleeve, shell, box, wall, outer pipe, and so on, may be installed around the reinforcing material prior to introduction of the polymeric material. In this case, the polymeric material may be placed (i.e., poured) into the interior of the containment component on top of the reinforcing material.

30 Claims, 16 Drawing Sheets

U.S. PATENT DOCUMENTS

| | | | |
|---|---|---|---|
| 5,385,431 A | 1/1995 | Topf, Jr. | 405/157 |
| 5,431,553 A | 7/1995 | Topf, Jr. | 425/11 |
| 5,536,457 A | 7/1996 | Topf, Jr. | 264/32 |
| 5,632,307 A | 5/1997 | Fawley et al. | 138/99 |
| 5,677,046 A | 10/1997 | Fawley et al. | 428/295.4 |
| 5,683,530 A | 11/1997 | Fawley et al. | 156/94 |
| 6,126,206 A | 10/2000 | Topf, Jr. | 285/109 |
| 6,435,218 B2 | 8/2002 | Hillenbrand et al. | 138/172 |
| 6,435,566 B1 | 8/2002 | Topf, Jr. | 285/236 |
| 6,692,039 B2 | 2/2004 | Topf, Jr. | 285/370 |
| 6,800,157 B2 | 10/2004 | Tarbutton et al. | 156/73.5 |
| 7,165,579 B2 | 1/2007 | Borland et al. | 138/99 |
| 7,168,743 B2 * | 1/2007 | Nadarajah et al. | 285/15 |
| 2003/0151249 A1 | 8/2003 | Topf, Jr. | 285/55 |
| 2004/0129373 A1 | 7/2004 | Nadarajah | 156/94 |
| 2005/0082831 A1 | 4/2005 | Borland | 285/369 |
| 2005/0098208 A1 | 5/2005 | Topf, Jr. | 137/15.14 |

FOREIGN PATENT DOCUMENTS

| | | |
|---|---|---|
| DE | 2441563 | 2/1976 |
| FR | 2851635 A | 8/2004 |
| GB | 2093146 A * | 8/1982 |
| GB | 2343728 A * | 5/2000 |

OTHER PUBLICATIONS

Clock Spring ®, Composite Sleeve Reinforcement System, pp. 1-4, 2004, available at http://www.clockspring.com/PDF/brochure.pdf.

Kessler, Michael R., et al., Evaluation of Carbon/Epoxy Composites for Structural Pipeline Repair, Proceedings of IPC 2004, International Pipeline Conference, Calgary, Alberta, Canada, Paper IPC04-0486: pp. 1-6, Oct. 4-8, 2004.

A.G. Gibson, The cost effective use of fibre reinforced composites offshore, Apr. 2003, University of Newcastle Upon Tyne for the Health and Safety Executive, Newcastle Upon Tyne, United Kingdom.

AEA Technology Consulting, Temporary/permanent pipe repair—Guidelines, Offshore Technology Report 2001/038, Jul. 2001, Health and Safety Executive.

3X Engineering, Reinforcekit Evolution Implementation, pp. 1-2, 2006, available at http://www.3xengineering.com/corrosion.html, last accessed Jun. 11, 2007.

Declaration of Henry E. Topf, Jr. under 37 C.F.R. 1.132, dated Jun. 15, 2007.

Exhibit A—Handwritten notes signed by Henry E. Topf Jr., dated Jul. 5, 2002.

Exhibit B—Affidavit of Kevin Murphy, dated Dec. 29, 2005.

* cited by examiner

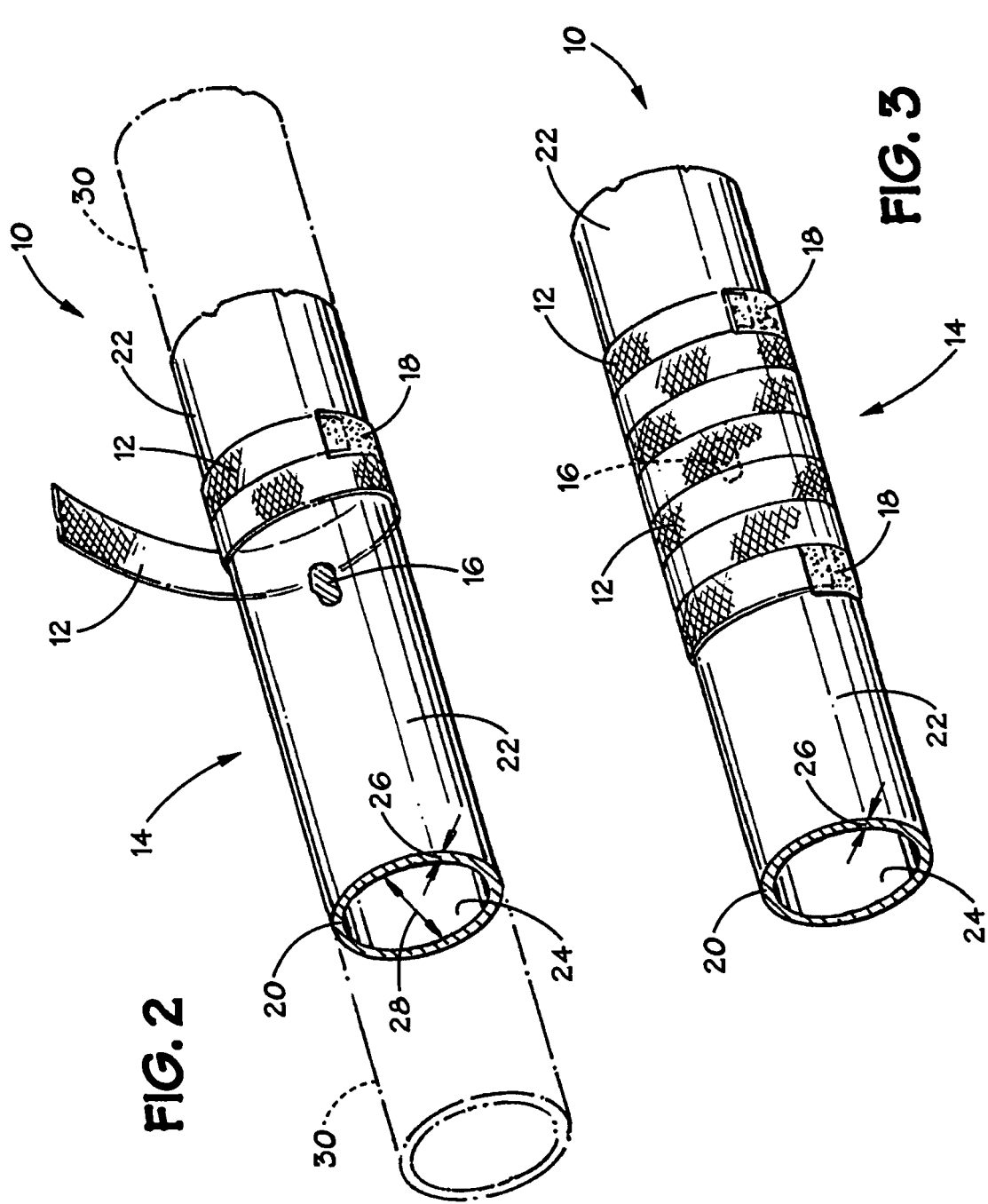

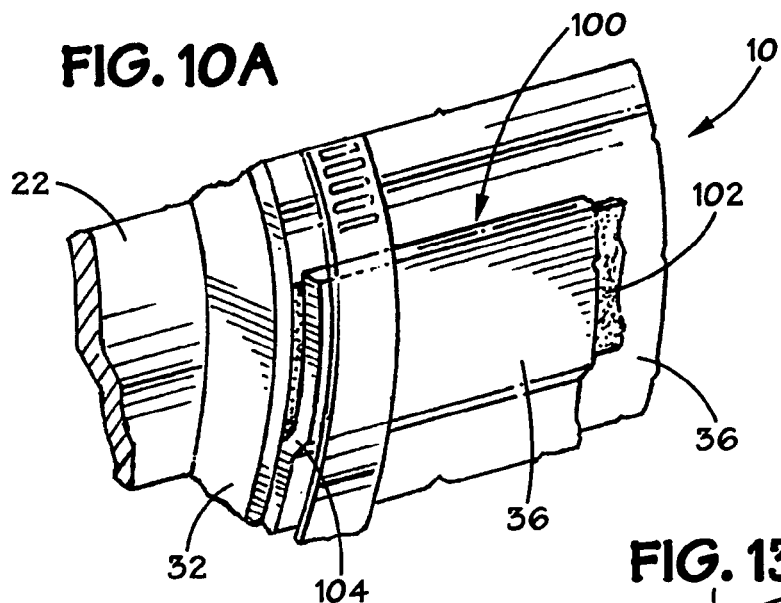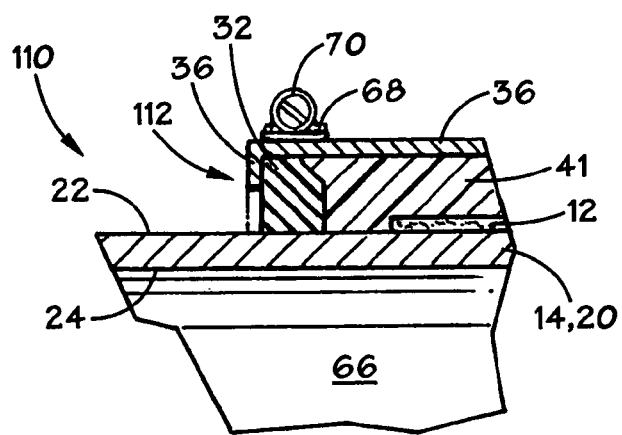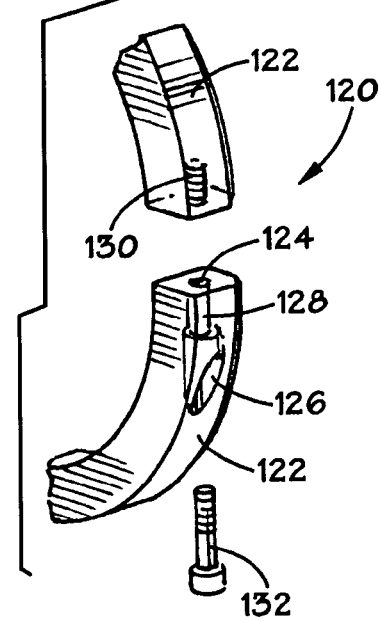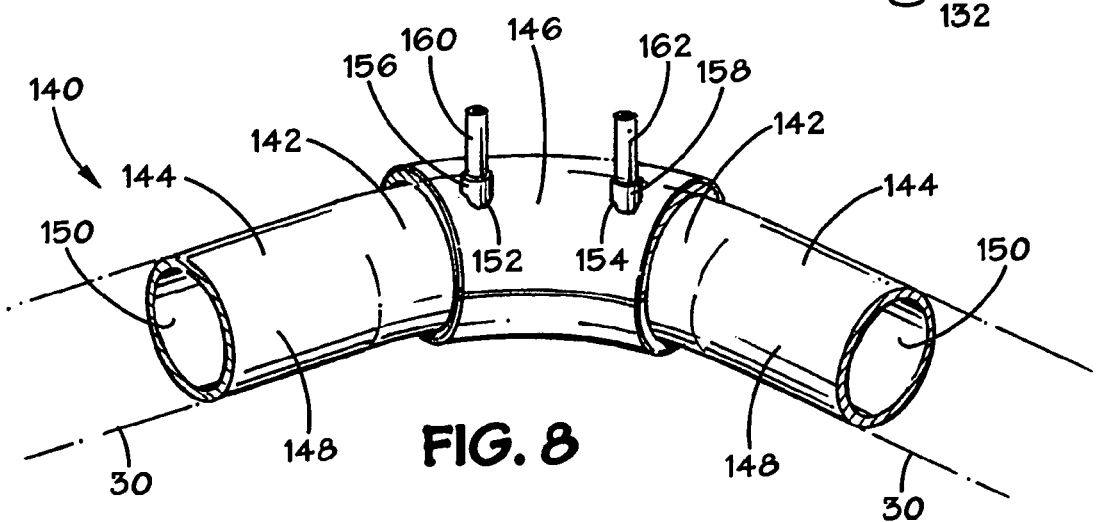

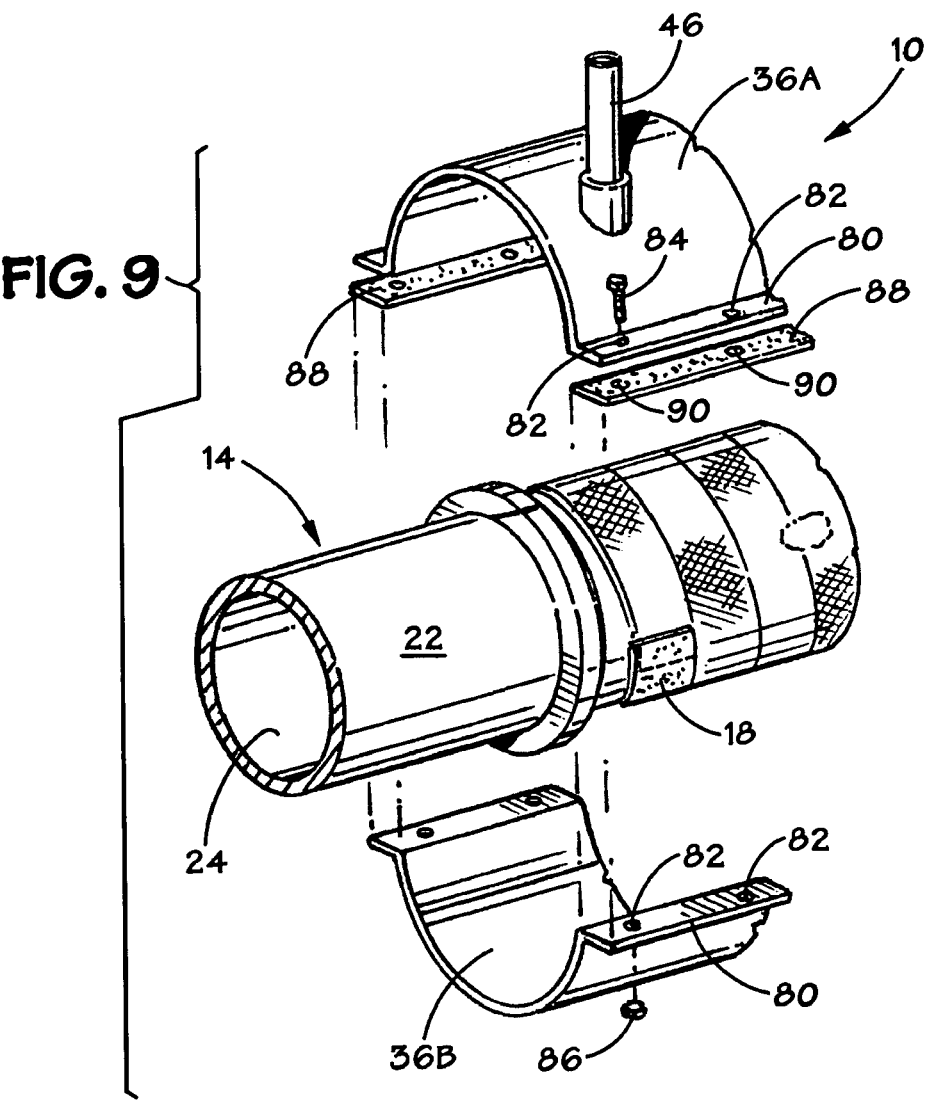
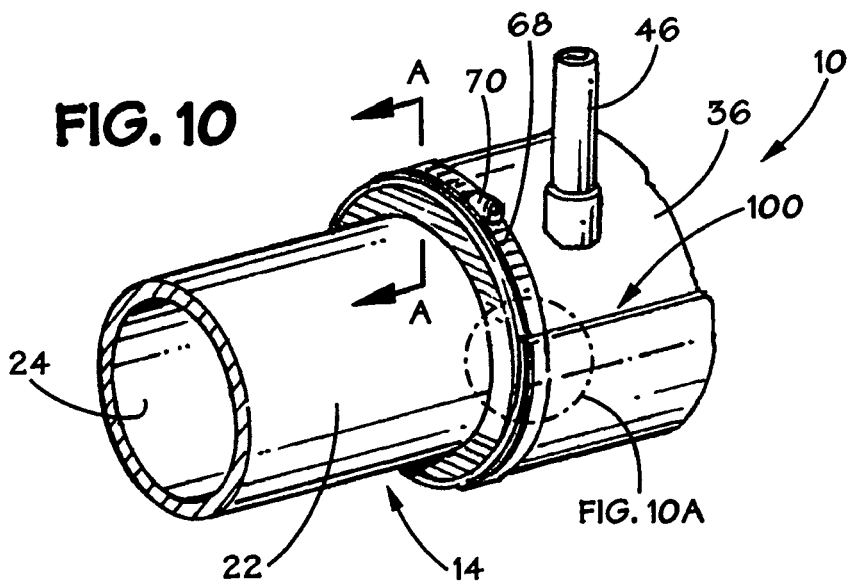

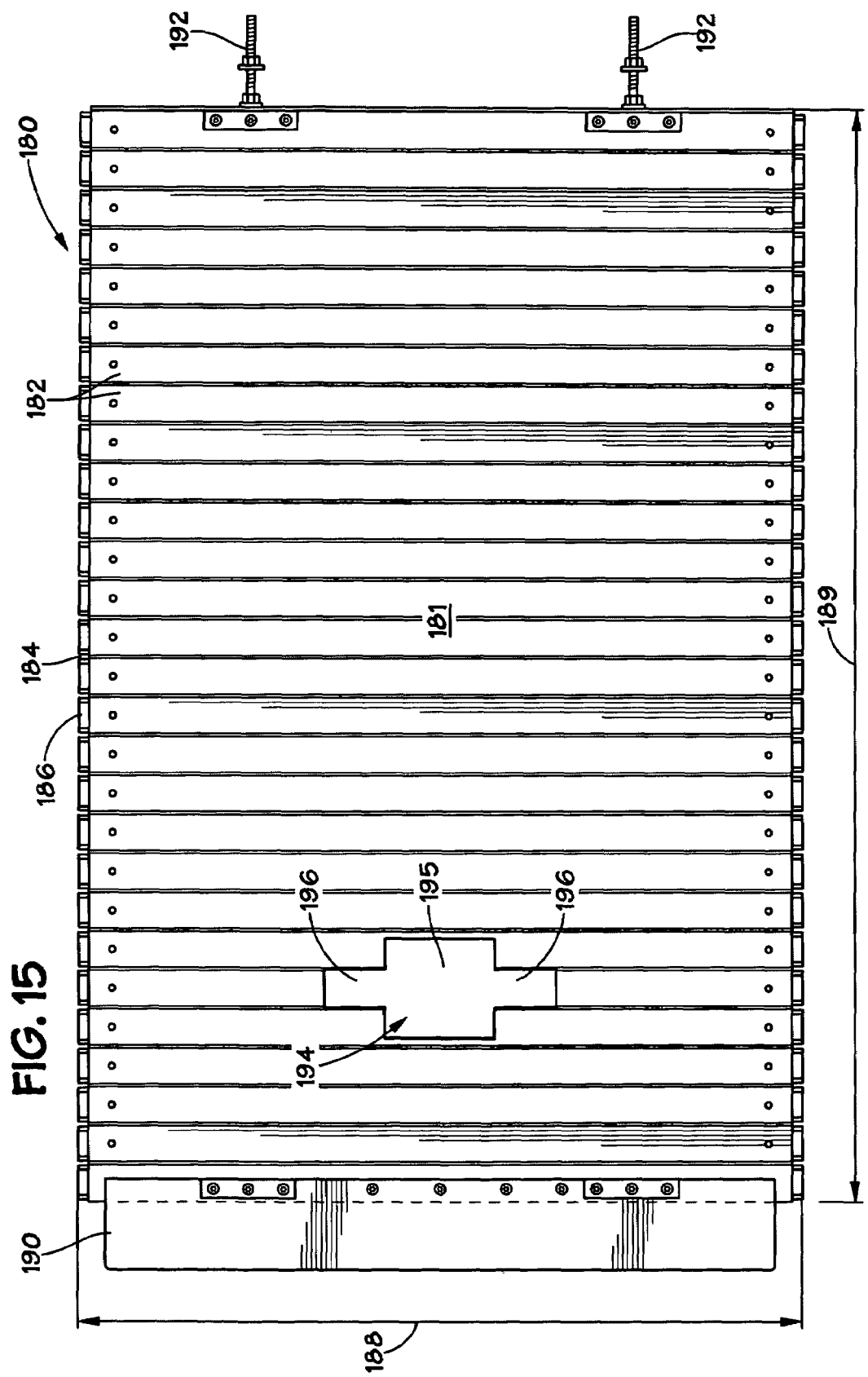

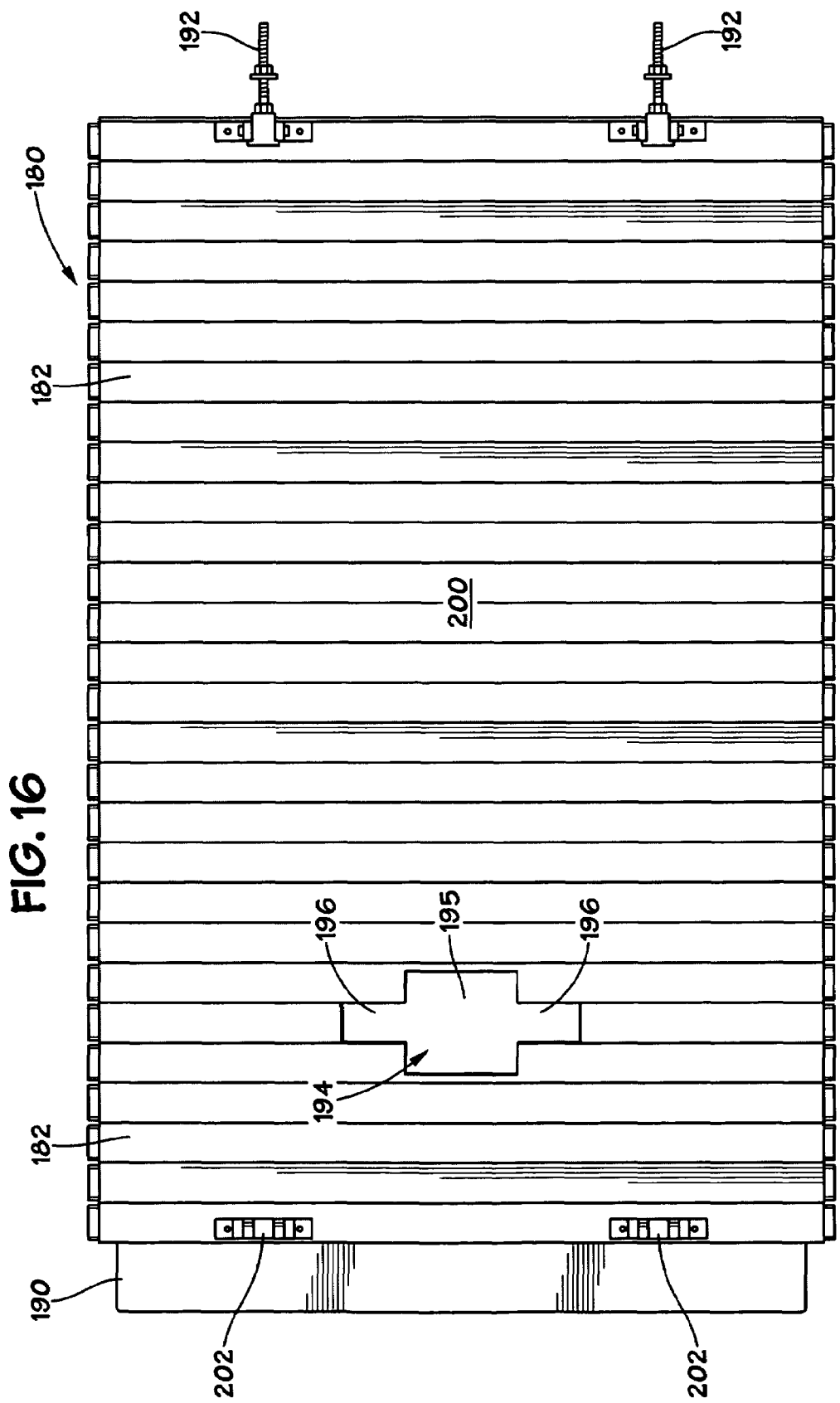

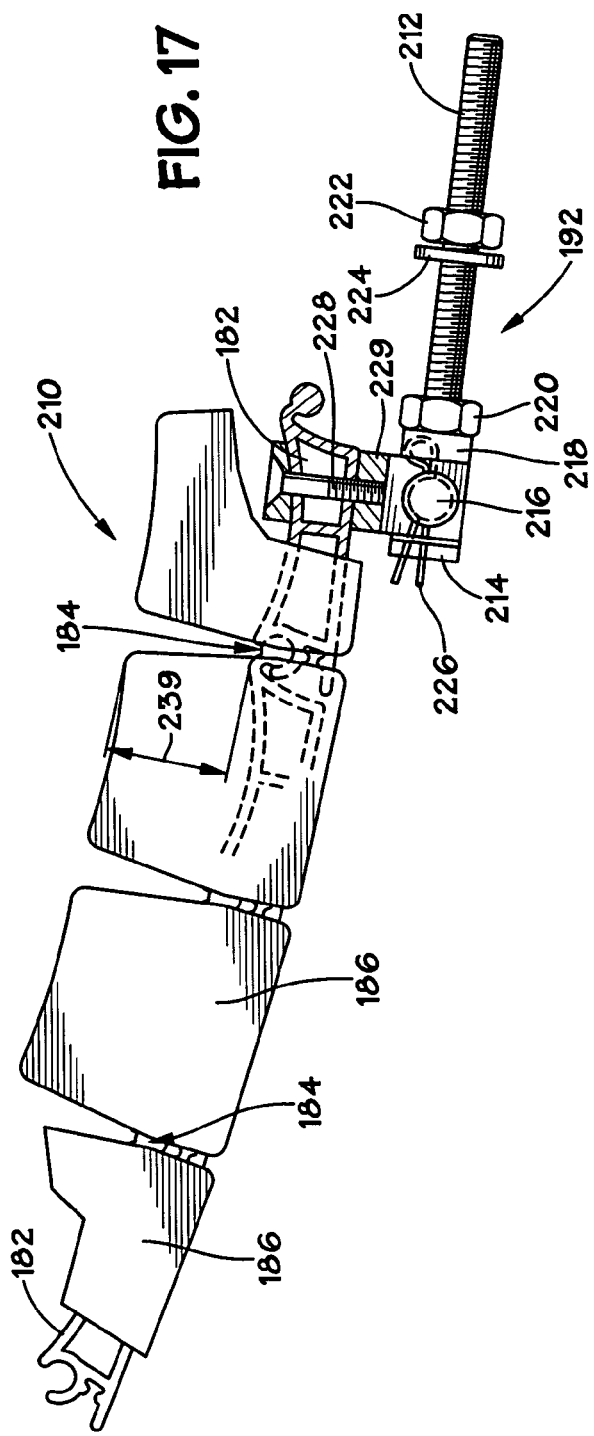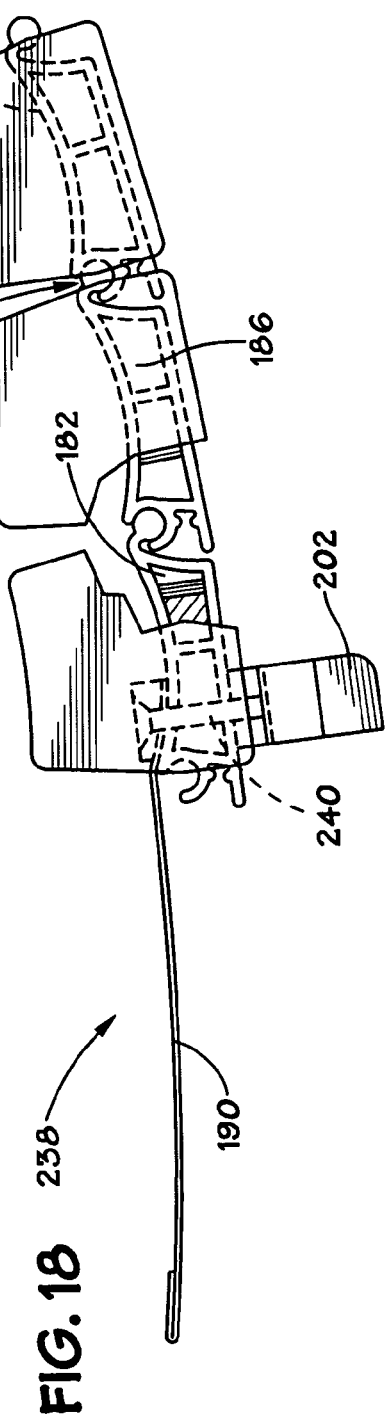

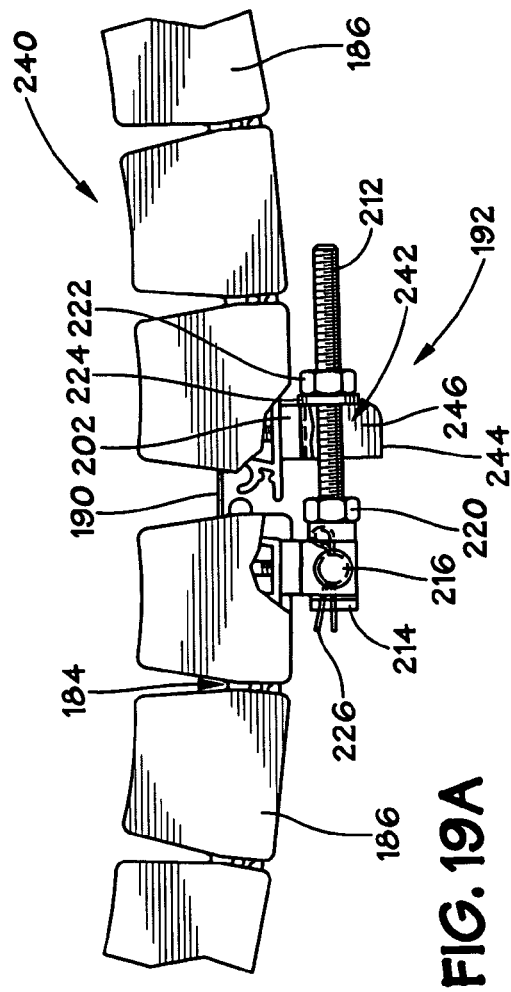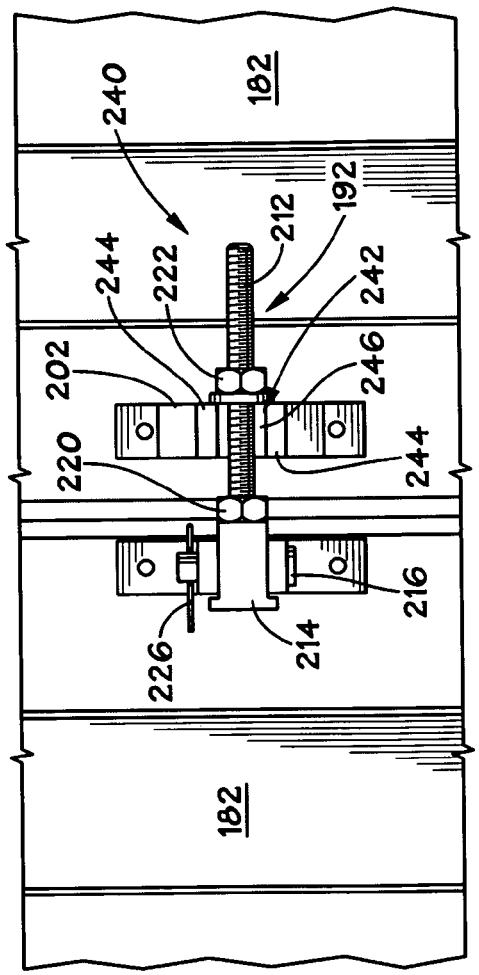

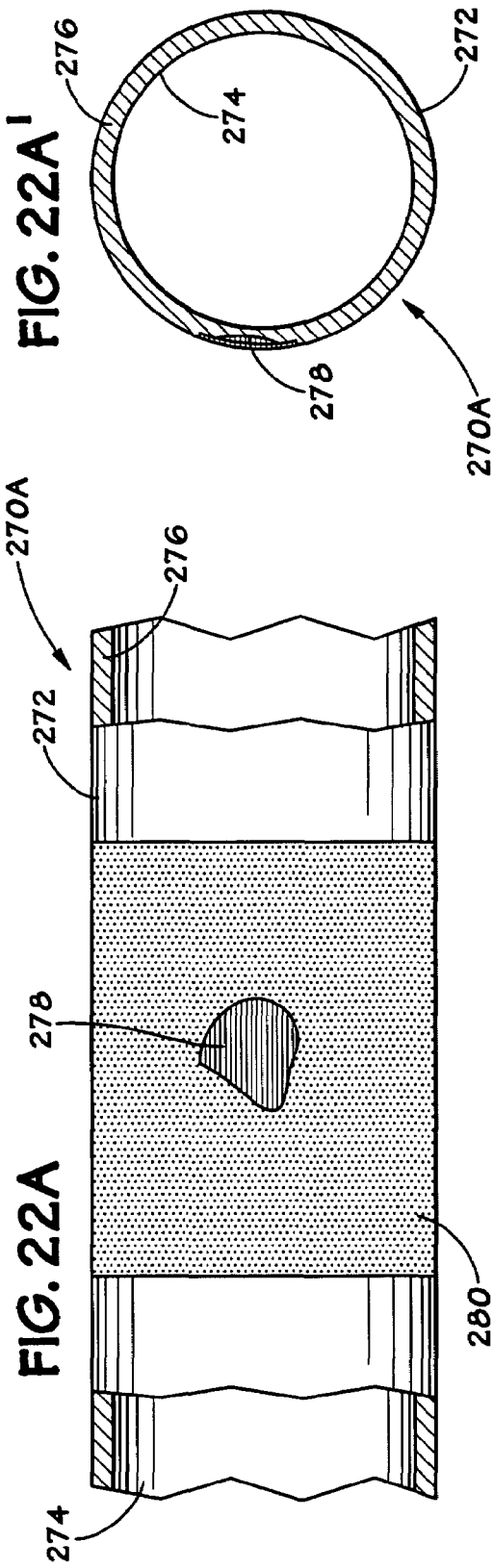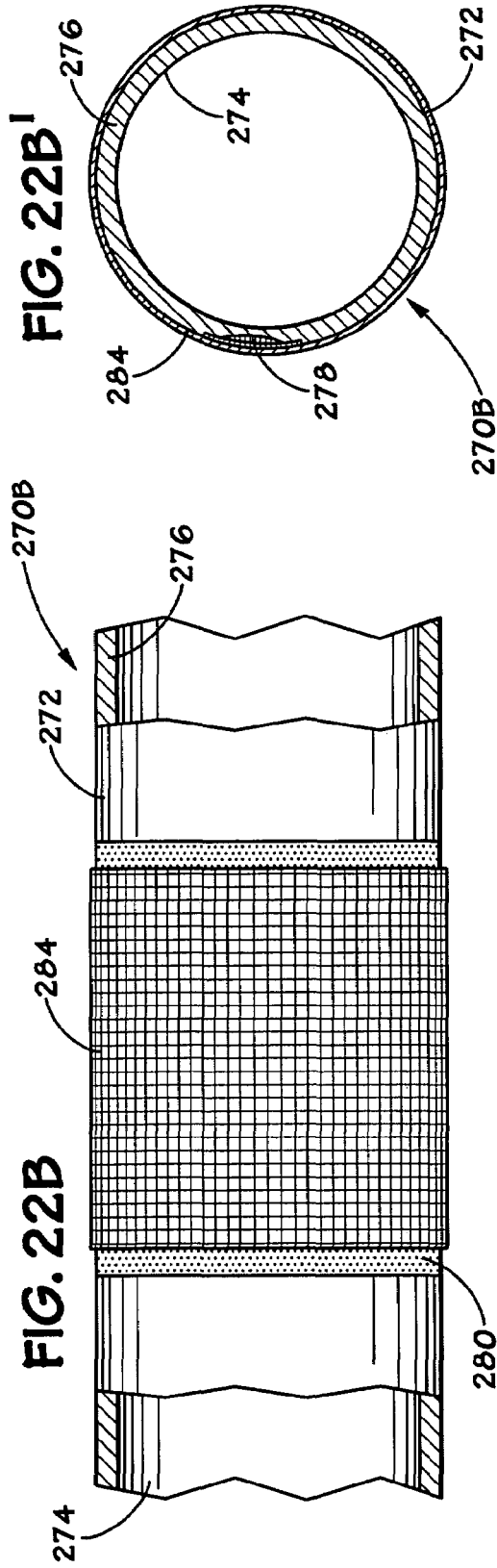

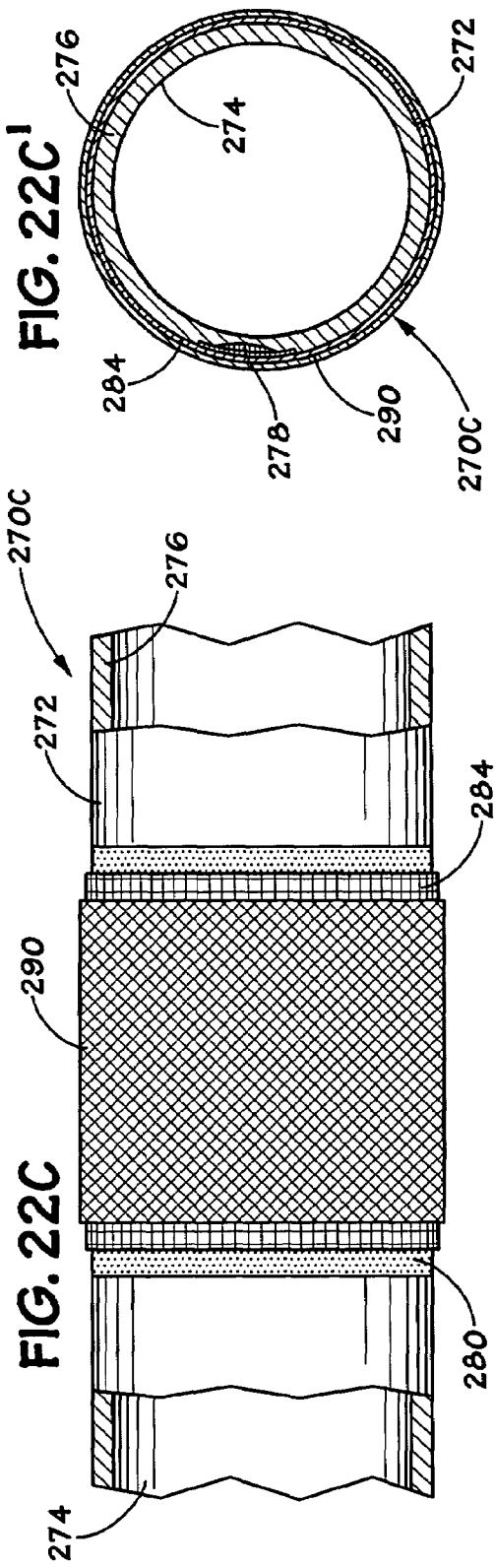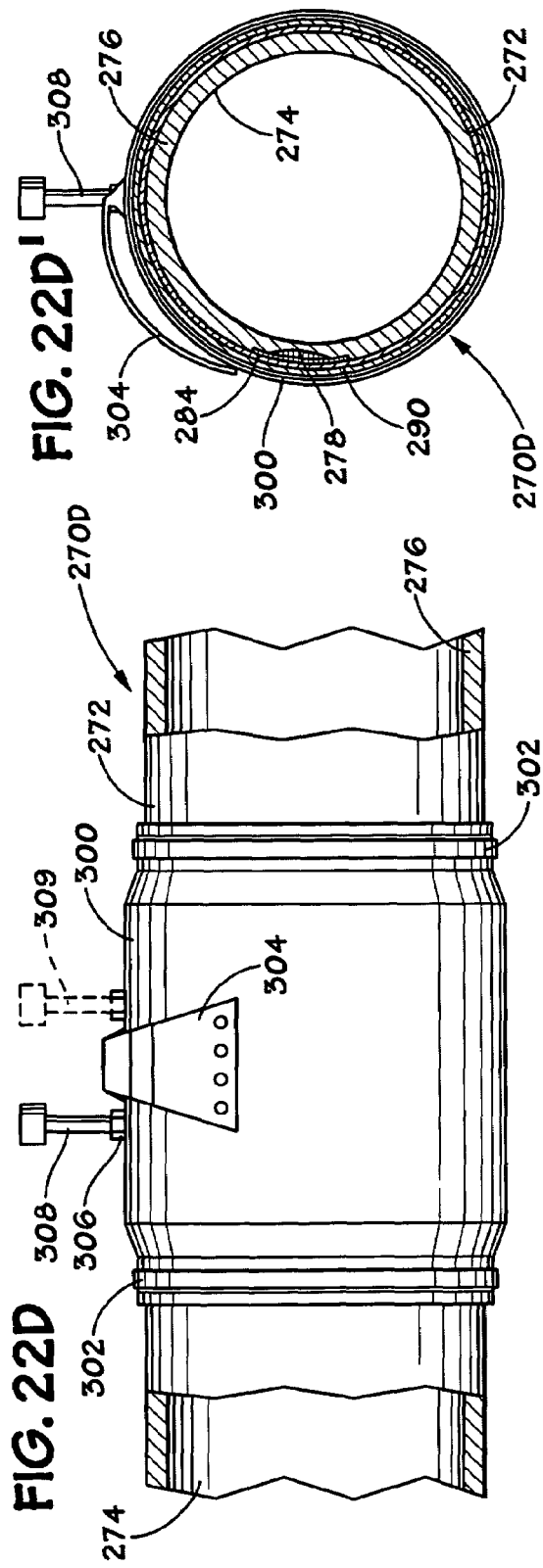

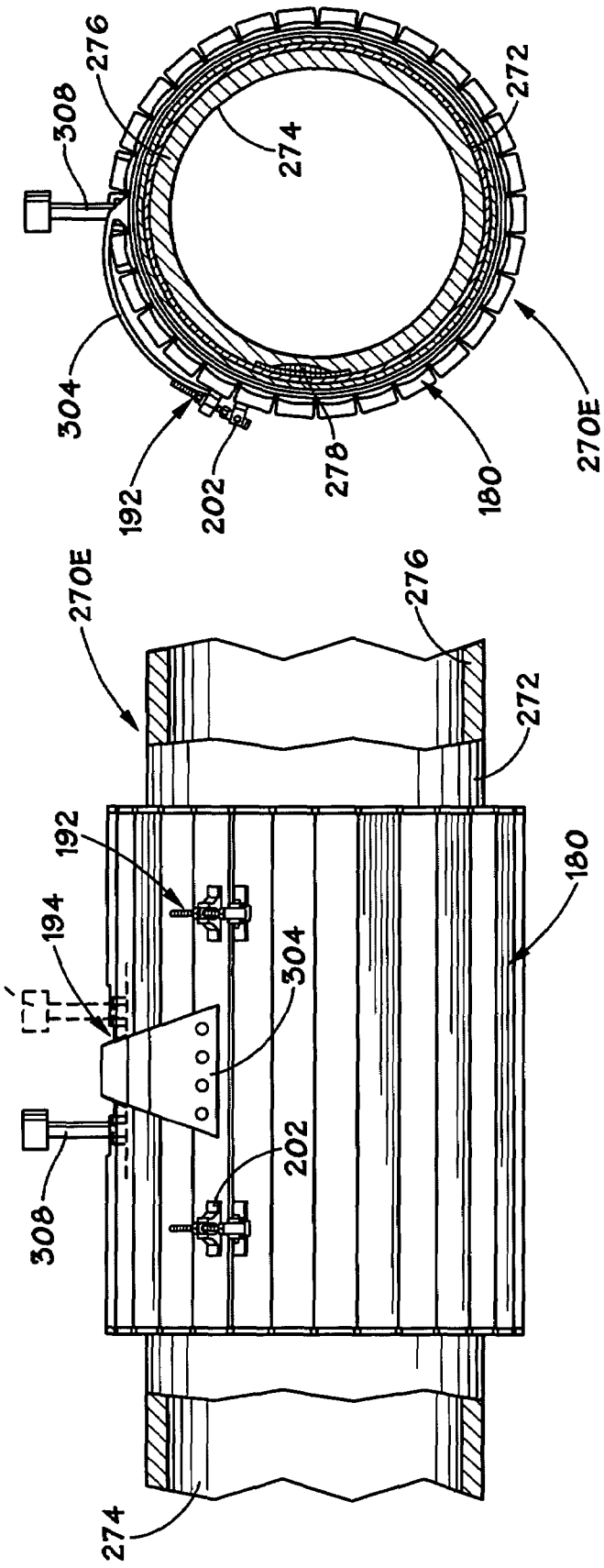

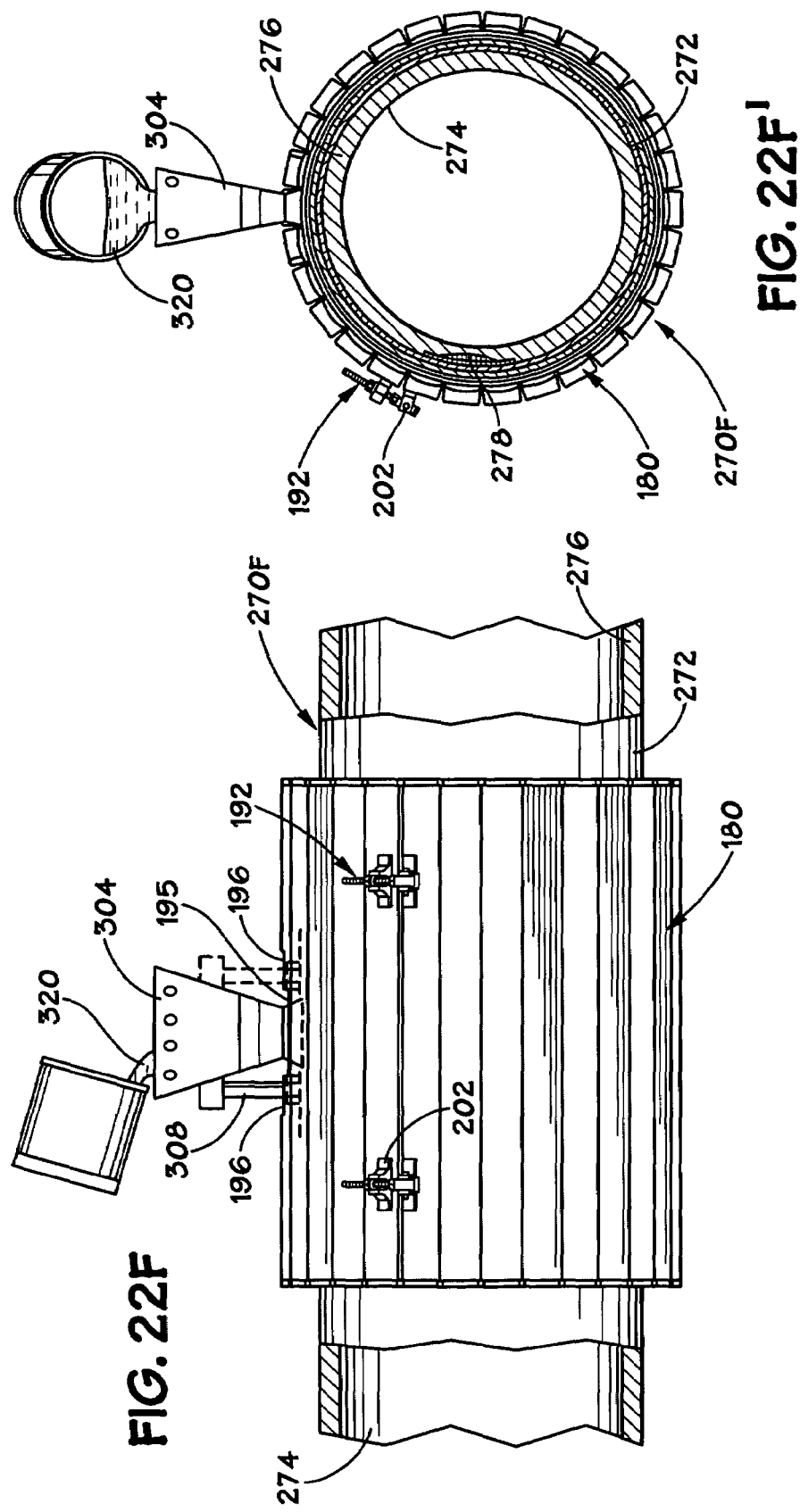

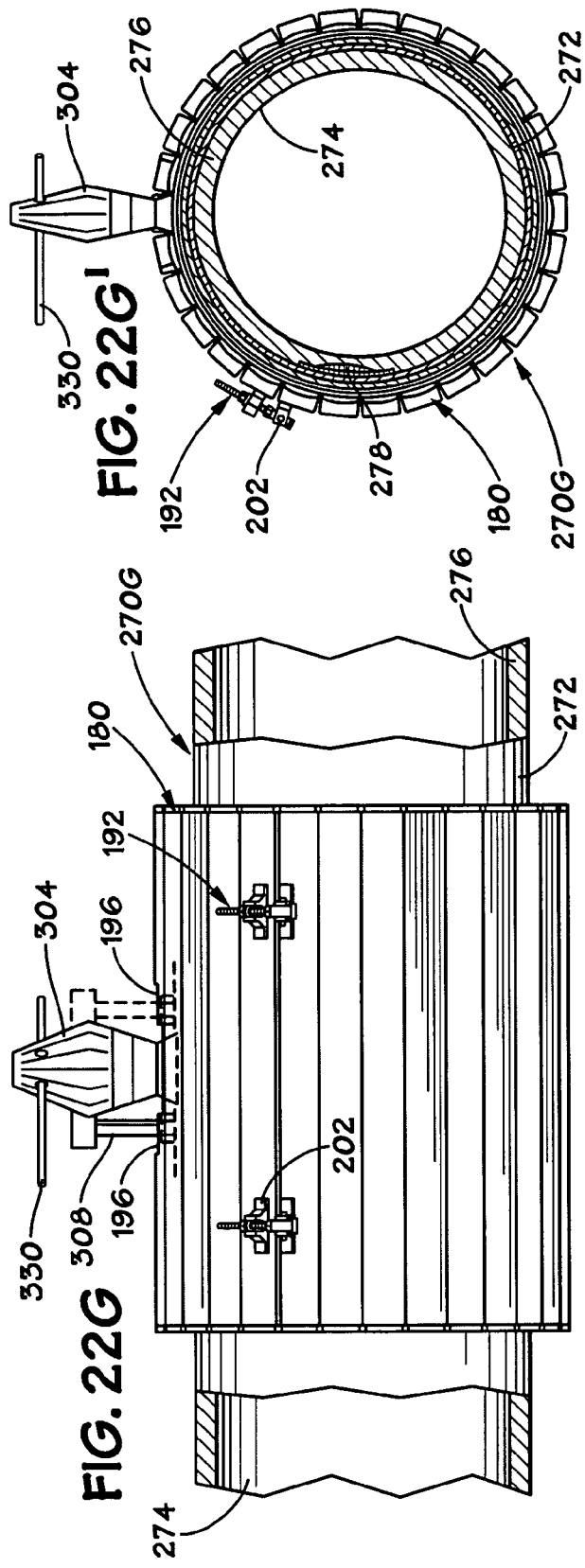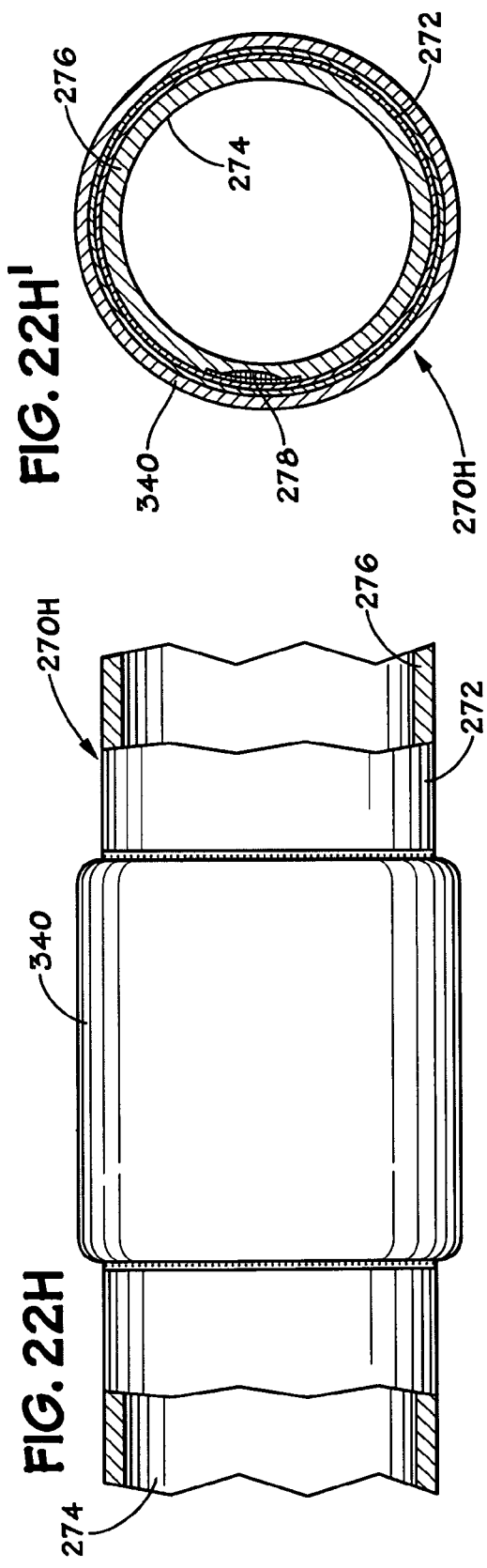

SYSTEM AND METHOD FOR PIPE REPAIR

CROSS-REFERENCE TO RELATED APPLICATIONS

This application is a continuation-in-part (CIP) of U.S. application Ser. No. 11/003,199 filed on Dec. 3, 2004, which is hereby incorporated by reference.

BACKGROUND

The invention relates generally to pipe repair. More particularly, the invention relates to techniques for efficiently repairing a pipe with fiber-reinforced polymeric material.

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Piping is omnipresent in today's society. Piping is found in a wide range of residential, commercial, and industrial applications. For example, piping may be employed in utility distribution, manufacturing processes, chemical/petrochemical transport, energy transmission, plumbing, heating and cooling, sewage systems, as well as in the recovery of spent chemicals/compounds, such as discharges of exhausted chemicals, contaminated water, and so forth. In operation, piping within facilities and over longer distances, may serve to collect, distribute, and transport water, steam, chemicals, petrochemicals, crude oil, natural gas, and a variety of other liquids, gases, and components.

Piping systems, such as pipelines, may convey utilities, energy, and chemical/petrochemical components to industrial patrons, manufacturing sites, chemical/refining facilities, commercial entities, public institutions, consumers, and so on. Undeniably, pipelines (e.g., transmission pipelines) have played a beneficial role in improving productivity in delivery of resources. Indeed, world economies depend on the capability of pipelines to transport feedstocks and products to a diverse range of customers and end-users.

Peak construction of pipelines (e.g., gas and liquid petroleum pipelines) occurred 30-40 years ago, with a majority of these pipelines, including many constructed prior to World War II, still in service. As a result of their age, maintaining the integrity of the aging pipeline infrastructures is costly. Annual costs attributable to mitigating pipeline corrosion and other pipeline failures, potential failures, and anomalies, are in the billions of dollars. Economic considerations of pipeline repair may include labor, material, equipment requirements, available capital, economic return, repair life, pipeline downtime, and so forth. As expected, the economics of pipeline repair can have a significant impact on pipeline productivity.

Pipe failures and damage may be caused by mechanical harm, corrosion, erosion, damaged coatings, failing insulation, adverse operating conditions, weather, and so on. Internal erosion, for example, may occur due to the flow of the contents through the pipeline. Such erosion may be exacerbated by centrifugal forces associated with changes in the direction of the flow path. In regard to corrosion, the external surface of piping may be exposed to corrosive soil or above-ground corrosive environments, and the internal surface of piping may be exposed to corrosive contents. Significantly, erosion, corrosion, and other damage may reduce the wall thickness of the pipe and thus reduce the pressure rating or pressure-holding capacity of the pipe or pipeline. Accordingly, the operations and maintenance personnel of pipeline companies (e.g., gas transmission companies) may determine if a failure or an area of potential failure discovered in a pipeline should be repaired, if a section of the pipe should be replaced, or if the pipeline should be abandoned.

In evaluating repair decisions, pipeline operators and service providers typically consider the pipeline downtime, pipe specifications, the pipe area to be repaired, buried conditions, the above-ground environment, the contents of the piping or pipeline, pipeline operating conditions, and the like. Of course, the pipeline operators and service providers should accommodate regulatory constraints, appropriate industry standards, manufacturer recommendations, and so on. Moreover, the maintenance approach ultimately selected may involve repair of a leak or other failure, or the preemptive repair of a pipe area prior to failure (e.g., leak, rupture, etc.) of the pipeline. Finally, in an effort to maintain pipeline integrity while being mindful of costs, the environment, regulatory constraints, and so on, the pipeline operators and service providers typically assess the maintenance, replacement, and repair of piping/pipelines based on available engineering alternatives and the economic impact of those alternatives. In the case of a repair, several technologies, application techniques, and materials are available.

Common repair technologies employ metal sleeves that are disposed about a section of a pipe to reinforce the pipe. Both welded sleeves and non-welded (mechanical) sleeves may be installed over varying lengths and diameters of piping to repair pipe leaks and other failures. Also, sleeves may preemptively repair potential pipe failures, reinforce pipe areas of internal and external corrosion, upgrade the pressure rating of the piping, and so forth. In general, established sleeve techniques, whether utilizing sleeves welded in place around the pipe, or employing sleeves mechanically secured to the pipe without welding, offer the advantage of being familiar repair approaches in the industry. In the repair of pipelines, operators, engineers, and craftsman are accustomed to working with welded fittings for welded sleeves, as well as with mechanical devices and clamps for non-welded sleeves. Unfortunately, the training of personnel in the suitable mechanical and welding techniques is extensive for proper installation of the sleeves. Further, non-welded and welded sleeve repair of pipelines may result in embrittlement and residual stresses at the point of repair on the pipeline.

For welded sleeves, the sleeves may be welded around the pipe to be repaired, encasing the pipe segment to be reinforced. The mating edges of the sleeve halves may be welded to each other, and the ends of the erected sleeve welded to the pipe, to seal and secure the welded sleeve to the pipe. It should be emphasized that a variety of welding configurations other than the generic approach described above may be employed in installing the welded sleeve. Costs associated with welding repairs, including welded-sleeve repairs (e.g., on high-pressure transmission pipelines), may be attributed to the use of highly-skilled welders, the shutdown and deinventory of the pipeline, and the shutdown of associated manufacturing facilities, chemical/petrochemical processes, and so on.

Generally, it is desirable from an operating cost standpoint to repair piping while the pipeline remains in service, thus eliminating costly downtime. Repair techniques that avoid welding or cutting of the pipe, for example, may make it feasible to maintain the pipeline in service during the repair and thus avoid the costs associated with pipeline downtime. It should be emphasized that a shutdown of a pipeline for repair can potentially force the shutdown of upstream and downstream facilities, resulting in lost production, lost sales, shutdown and startup costs, and so forth.

Non-welded sleeves address this concern, because they generally do not require welding or cutting. Non-welded reinforcement sleeves are mechanically coupled to the pipe section to be repaired. In other words, these non-welded sleeves (also called mechanical sleeves) may be positioned and secured to the pipe by clamps, bolts, and so on. Regrettably, the use of non-welded sleeves may require exotic mechanical techniques to adequately secure the repair and pipe pressure rating, and thus may be more cumbersome and complicated than welding techniques. As a result, pipe repair with non-welded sleeves may be more expensive than repair with welded sleeves. However, repair with non-welded sleeves may advantageously avoid welding at the on-site repair, such as in pipeline areas and in chemical/ petrochemical process areas, for example. Further, as indicated, non-welding approaches generally permit uninterrupted operation of the pipeline. On the other hand, in certain configurations for non-welded (mechanical) sleeves, the pipeline may be deinventoried if significant mechanical force is to be applied to the pipe or because of other factors during installation of the non-welded sleeve.

Unfortunately, the special case of repair of piping elbows, piping tees, pipeline bends, and so on, is problematic for both welded and mechanical (non-welded) sleeves due to the difficultly of placing a rigid metal sleeve around the curved pipe bend to be repaired. Further, the rigid metal sleeves may be unable to make adequate contact at the pipeline bends, and thus be unable to reinforce the stressed points that typically exist at the pipeline bends. Furthermore, it may be may be difficult to appropriately match the radius of curvatures of the outer metal sleeve and the pipeline elbow or bend. To avoid these problems with installing sleeves at pipeline bends, a weld filler metal (in lieu of a sleeve) may be deposited on the bend (e.g., in a cavity of an anomaly) but such welded filler repairs are generally appropriate only for limited ranges of pipeline operating pressures and wall thicknesses.

As can be seen from the discussion in the paragraphs above, a variety of challenges exist with welded and non-welded (mechanical) sleeves. On the whole, these established techniques of using reinforcement sleeves, whether welded or non-welded, tend to be costly, require highly skilled labor, result in increased pipe stresses, and increase the need to interrupt pipeline service. A need exists for improved techniques of pipe repair.

In response to the problems and challenges associated with the conventional approaches of welded and non-welded sleeves in the repair of both straight pipe and pipe bends, new technologies have emerged that involve coatings and the use of high-strength plastics, fiber-reinforced plastics, composite materials, and the like. Such polymeric repairs may reduce costs and provide for less embrittlement and residual stresses of than traditional welded and mechanical sleeves. Furthermore, polymeric composites, for example, generally do not oxidize and, consequently, may arrest further external corrosion of the treated area of the pipeline. Moreover, as a result of the growing using of composite repair systems, particularly in the oil and gas transportation industry, the American Society of Mechanical Engineers (ASME) is currently in the process of setting standards for non-metallic wrap technology including development of a new post-construction repair standard. Currently, a draft of the new ASME standard specifies that several material properties of the repair system are to be measured and evaluated.

It should be noted that resin alone (without reinforcing materials) typically does not provide adequate strength for pipe repair, especially in the repair of medium and high pressure pipelines. Accordingly, in general, polymer repair systems are based on a matrix composite fabric with epoxy materials and other resins, creating a monolithic structure around the damaged pipe. In general, a variety of fibers, polymers, resins, pre-polymers, adhesives, and other components may be used to form a composite material structure around the damaged portion of the pipe. In particular, composite repair systems typically employ glass fibers and offer the potential to reduce repair costs of corroded pipes by avoiding costly mechanical sleeves, welding, and downtime.

As discussed below, however, fabrication of these composite repairs tends to be labor intensive. For example, each layer of the fiber is wetted with dripping resin prior to wrapping the fiber around the pipe. Several layers of fiber and resin (also referred to herein as polymer) are methodically applied by hand one layer at a time, with the fibers slowly and carefully pre-wetted in resin prior to the application of each fiber layer. For example, the fiber (e.g., fiber tape) may be pulled through a bath of polymer (e.g., epoxy resin) as the fiber is cumbersomely applied to the pipe. Such tedious handling and open installations pose environmental and application challenges, increased handling of resin chemicals and solvents, increased labor time, and the like.

In addition, as appreciated by those of ordinary skill in the art, the worker should be aware of the resin pot life (i.e., resin set-up time in minutes or hours) where the viscosity of the resin significantly increases as the pot life expires, making it difficult to properly apply the resin to the fiber, and to effectively mold and form the polymer resin composite. The resin pot life should not be confused with the resin cure time which is the time for the resin to form a cross-linked thermoset, typically occurring a day or several days later. The pot life (and associated increase in viscosity) of such resin systems may typically only comprise a few minutes. Undoubtedly, an installation not completed prior to expiration of the resin pot life could result in a flawed composite structure surrounding the pipe and pipe anomaly.

In general, a tension exists between the technique of slow and cumbersome pre-wetting and application of the fiber, layer-by-layer, versus the relatively hasty formation of the viscous resin structure due to expiration of the resin pot life and associated increase in viscosity. Thus, in pipe composite repair, many fiber and resin systems are difficult to mold and shape into the appropriate composite structure that overlay the pipe and pipe anomaly.

DRAWINGS

The foregoing and other advantages and features of the invention will become apparent upon reading the following detailed description and upon reference to the drawings in which:

FIG. 2 is a perspective view of a pipe under repair that illustrates a dry fiber mat being applied to the pipe in accordance with an exemplary embodiment of the present invention;

FIG. 3 is a perspective view of the pipe of FIG. 1 depicting the dry fiber not wrapped around and secured to the pipe in accordance with an exemplary embodiment of the present invention;

FIG. 8 is a perspective view of a pipe repair system applied to an elbow or bend of a piping system in accordance with an exemplary embodiment of the present invention;

FIG. 9 is an exploded view of a portion of the pipe of FIG. 5 illustrating in more detail an exemplary connection of two halves of the outer component in accordance with an exemplary embodiment of the present invention;

FIG. 10 is perspective view of a portion of the pipe having an alternate outer component and alternate connection disposed on the outer component in accordance with an exemplary embodiment of the present invention;

FIG. 10A is a detailed view of a portion of FIG. 10;

FIGS. 11 and 12 are alternate cross-sectional views taken along section line A-A of FIG. 5 showing details of one end of the pipe having a hose clamp to secure the outer component around the repaired pipe in accordance with exemplary embodiments of the present invention;

FIG. 13 is a perspective view of an exemplary fastener (in lieu of a hose clamp) for fastening the outer component around the repaired pipe, the outer component used to retain the resin in accordance with an exemplary embodiment of the present invention;

FIG. 15 is a perspective view of an inside surface of a tambour used in the repair or reinforcement of pipe, vessels, and other objects in accordance with an exemplary embodiment of the present invention;

FIG. 16 is a perspective view of an outside surface of the tambour of FIG. 15 in accordance with an exemplary embodiment of the present invention;

FIG. 17 is a perspective view of a portion of the tambour having a male coupling for securing the tambour in accordance with an exemplary embodiment of the present invention;

FIG. 18 is a perspective view of a portion of the tambour having a female coupling and an end-gap span device in accordance with an exemplary embodiment of the present invention;

FIGS. 19A and 19B are perspective views of a secured tambour with the male coupling and the female coupling engaged in accordance with an exemplary embodiment of the present invention;

Figure 1:
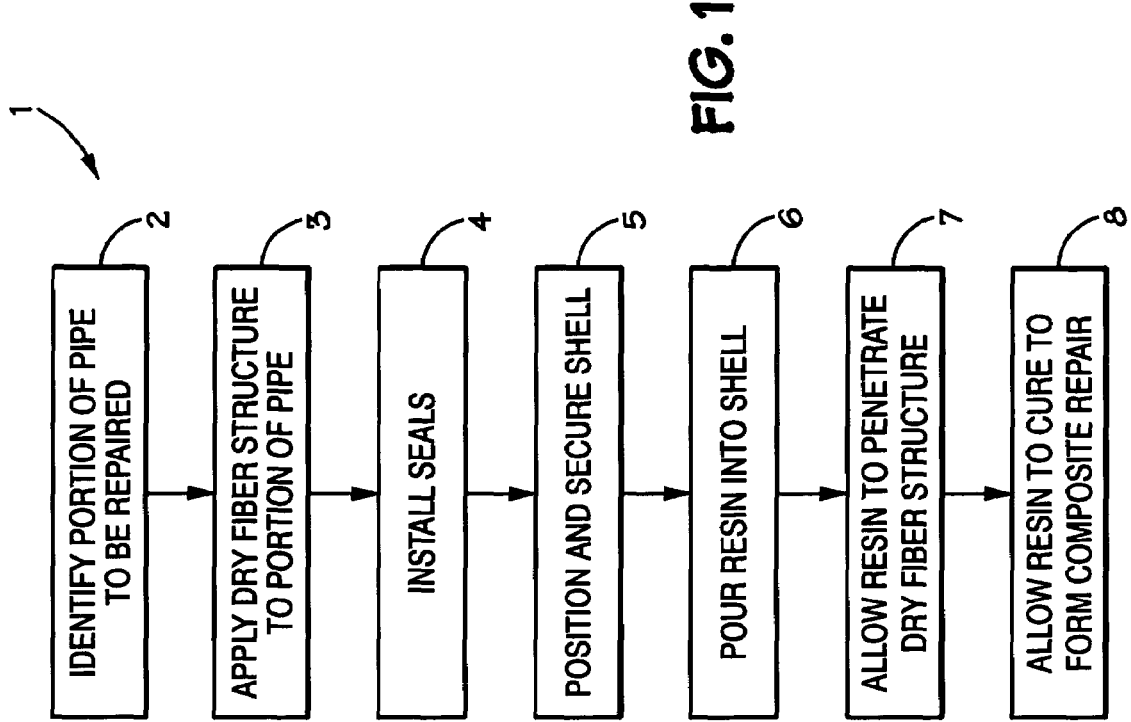
FIG. 1 is a block diagram of an exemplary method of repairing a pipe in accordance with an exemplary embodiment of the present invention.

FIGS. 22A and 22A' are a perspective view and cross-sectional view, respectively, of a pipe having a defect;

FIGS. 22B and 22B' are a perspective view and cross-sectional view, respectively, of the pipe of FIG. 22A having a dielectric wrap (e.g., fiberglass wrap) disposed on the outer surface of the pipe in accordance with an exemplary embodiment of the present invention;

FIGS. 22C and 22C' are a perspective view and cross-sectional view, respectively, of the pipe of FIG. 22B having a reinforcing fiber cloth (e.g., carbon fibers) wrapped around dielectric wrap in accordance with an exemplary embodiment of the present invention;

FIGS. 22D and 22D' are a perspective view and cross-sectional view, respectively, of the pipe of FIG. 22C having a fabric mold disposed around the reinforcing fiber cloth in accordance with an exemplary embodiment of the present invention;

FIGS. 22E and 22E' are a perspective view and cross-sectional view, respectively, of the pipe of FIG. 22D having a tambour disposed around the fabric mold in accordance with an exemplary embodiment of the present invention;

FIGS. 22F and 22F' are a perspective view and cross-sectional view, respectively, of the pipe of FIG. 22E depicting the introduction of resin into the fabric mold in accordance with an exemplary embodiment of the present invention;

FIGS. 22G and 22G' are a perspective view and cross-sectional view, respectively, of the pipe of FIG. 22F depicting pressurization of the resin via the fabric mold in accordance with an exemplary embodiment of the present invention; and FIGS. 22H and 22H' are a perspective view and cross-sectional view, respectively, of the pipe of FIG. 22G after the tambour and fabric mold have been removed to expose the hardened resin in accordance with an exemplary embodiment of the present invention.

DETAILED DESCRIPTION

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

To facilitate discussion of the present techniques, the written description is provided in sections. Section I discusses parts of an exemplary pipe repair system. Section II discusses pipe anomalies and pipeline survey techniques. Section III discusses properties of exemplary reinforcing materials. Section IV discusses exemplary polymer materials that may be used in pipe repair systems. Finally, Section V discusses pipe repair techniques employing a reinforcing containment (e.g., tambour) over a pliable mold.

I. Pipe Repair System

The present techniques provide for efficient pipe repair by forming a reinforced polymeric composite on the pipe while avoiding the typical extensive handling of the repair materials associated with composite repair. Initially, a section of the pipe to be repaired is identified. To implement the repair, a reinforcing material (e.g., a fiber structure) may be applied to the surface of the pipe section to be repaired. In certain embodiments, the reinforcing material is wrapped around the pipe but it may be applied in other forms, such as a patch. The reinforcing material is applied in a dry state to avoid problems associated with the handling of wet materials (e.g., resin-saturated fiber). The resin may then be applied to the reinforcing material on the pipe. For example, the resin may be applied with a brush, or after securing the reinforcing material to the pipe, an outer containment component (e.g., a sleeve, shell, box, wall, outer pipe, etc.) may be installed adjacent or around the reinforcing material. In the latter instance, a polymeric material, polymer precursor, and/or pre-polymer, and so on, is placed between the containment component and the reinforcing material. It should be emphasized that the term "polymeric material" as used herein is intended to broadly cover a variety of polymers, prepolymers, resins, hardeners, plastics, compounded mixtures, and so forth.

In certain configurations, a fluid or semi-fluid polymeric material is poured inside the containment component on top of the reinforcing material. The polymeric material penetrates the reinforcing structure prior to any significant increase in viscosity of the polymeric material. The properties of the reinforcing and polymeric materials may be selected such that the polymeric material penetrates or saturates the reinforcing structure by gravity, capillary behavior, external pressure, and so on. Lastly, the polymeric material may be allowed to cure or polymerize, forming a reinforced polymer composite that repairs the pipe and restores operating pressure capacity of the pipe or pipeline.

A. Identify Pipe Anomaly and Apply Dry Fiber Structure to Pipe

Turning to the drawings, FIGS. 1-7 depict an exemplary implementation of a pipe repair system 10 which may be used to repair and/or reinforce a pipe, increase the wall thickness of a pipe, restore or increase the pressure rating or pressure capacity of a pipe, repair a vessel or other equipment, and so on. FIG. 1 is a block diagram of a method 1 for repairing a pipe, and will be referred to in the discussion of the exemplary techniques depicted in FIGS. 2-7. Initially, an anomaly (e.g., corrosion, pitting, stress crack corrosion, etc.) may be detected on the inner or outer surface of the pipe, and thus the portion of the pipe to be repaired identified, as indicated in block 2. Upon identification and analysis of the anomaly (and prior to application of a reinforcing material such as a dry fiber structure), the anomaly may be pre-treated in some manner, such as by cleaning the anomaly, grinding or sanding the anomaly, placing filler material in the anomaly, and so on. With or without pre-treatment of the anomaly, the dry fiber structure (e.g., dry fiber tape or a patch) without impregnated resin may be applied or wrapped around the anomaly in the pipe (block 3). The dry fiber structure may be secured at each end by standard adhesives or tape, for example.

In the illustrated embodiment of FIGS. 2 and 3, a dry fiber structure 12 (e.g., a dry fiber tape, mat, fabric, etc.) is applied to a pipe 14 having a failure or anomaly 16. The pipe 14 may be part of a pipeline 30 (e.g., a gas or liquid transmission pipeline) and may be constructed of a variety of metallic and/or non-metallic materials, such as cement, plastics, and so on. Exemplary pipe metals may include steel, carbon steel, stainless steel, copper, brass, and more exotic metals such as nickel alloys and other metal alloys, and the like. Exemplary pipe polymeric materials include polypropylene, polyethylene, other thermoplastics, thermosets, filler-reinforced polymers, fiberglass-reinforced plastic, and so on. The pipe 14 may also include internal and external coatings (not illustrated) to arrest corrosion, inhibit exposure to sunlight, protect against chemical attack, and so forth. Lastly, as indicated, the wall thickness 26 of the pipe 14 may be specified to satisfy a desired pressure rating of the pipe 14 and the piping system (e.g., pipeline 30).

In this example, the dry fiber structure 12 may be initially secured to the pipe 14 with an adhesive component 18, such as a typical adhesive or tape previously mentioned. For instance, upon securing one end of the dry fiber structure 12, one or more layers of the dry fiber structure 12 may be wrapped around the pipe 14 to initiate the repair of the failure or anomaly 16 and/or to restore some or all of the pressure rating or pressure capacity of the pipe 14. In general, the dry fiber structure 12 covers the outer surface 22 of a portion of the pipe 14 to be repaired. It should be emphasized that the dry fiber structure 12 may be applied as a patch or other forms instead of wrapped around the pipe. Moreover, the dry fiber structure 12 and repair system 10 may be applied to equipment other than piping, such as vessels, vessel nozzles, machines, tanks, pumps, reactors, and so forth. In the case of a pipe 14, the pipe 14 typically includes a cylindrical wall 20 having an outer surface 22 and an inner surface 24. Variables to consider in the selection of the dry fiber structure 12 to restore or maintain the desired pressure rating of the pipe 14 include the wall thickness 26, the inside diameter 28, the materials of construction of the pipe 14, and other factors.

To reinforce or repair the pipe 14, the present techniques provide for a substantially self-forming composite of the dry fiber structure 12 and resin on the outer surface 22 of the pipe 14. As discussed in detail below, properties of the dry fiber structure 12 and resin may be specified such that hand or wet lay-up is not required because the resin penetrates around the fibers within the dry fiber structure 12 to the outer surface of the pipe 14. Thus, the resin may be applied on top of the fiber structure without having to pre-wet the fibers or layers of the fiber structure. Again, the cumbersome handling of wet dripping fiber may be advantageously avoided.

B. Install Seals and Outer Containment Component on Pipe

Figure 4:
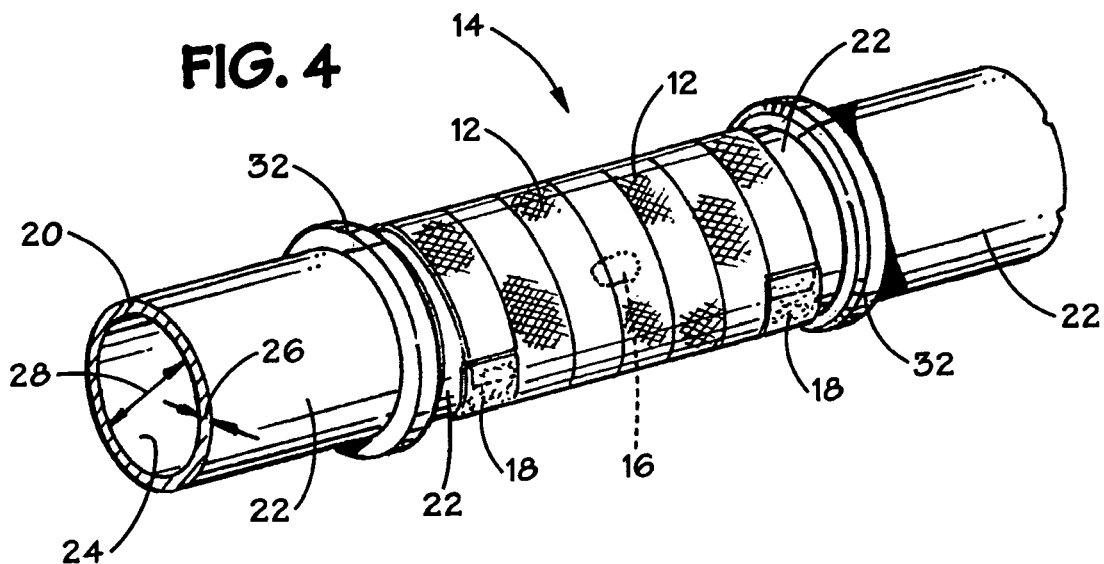
FIG. 4 is a perspective view of the pipe of FIG. 2 having seals installed on the pipe in accordance with an exemplary embodiment of the present invention.
Figure 5:
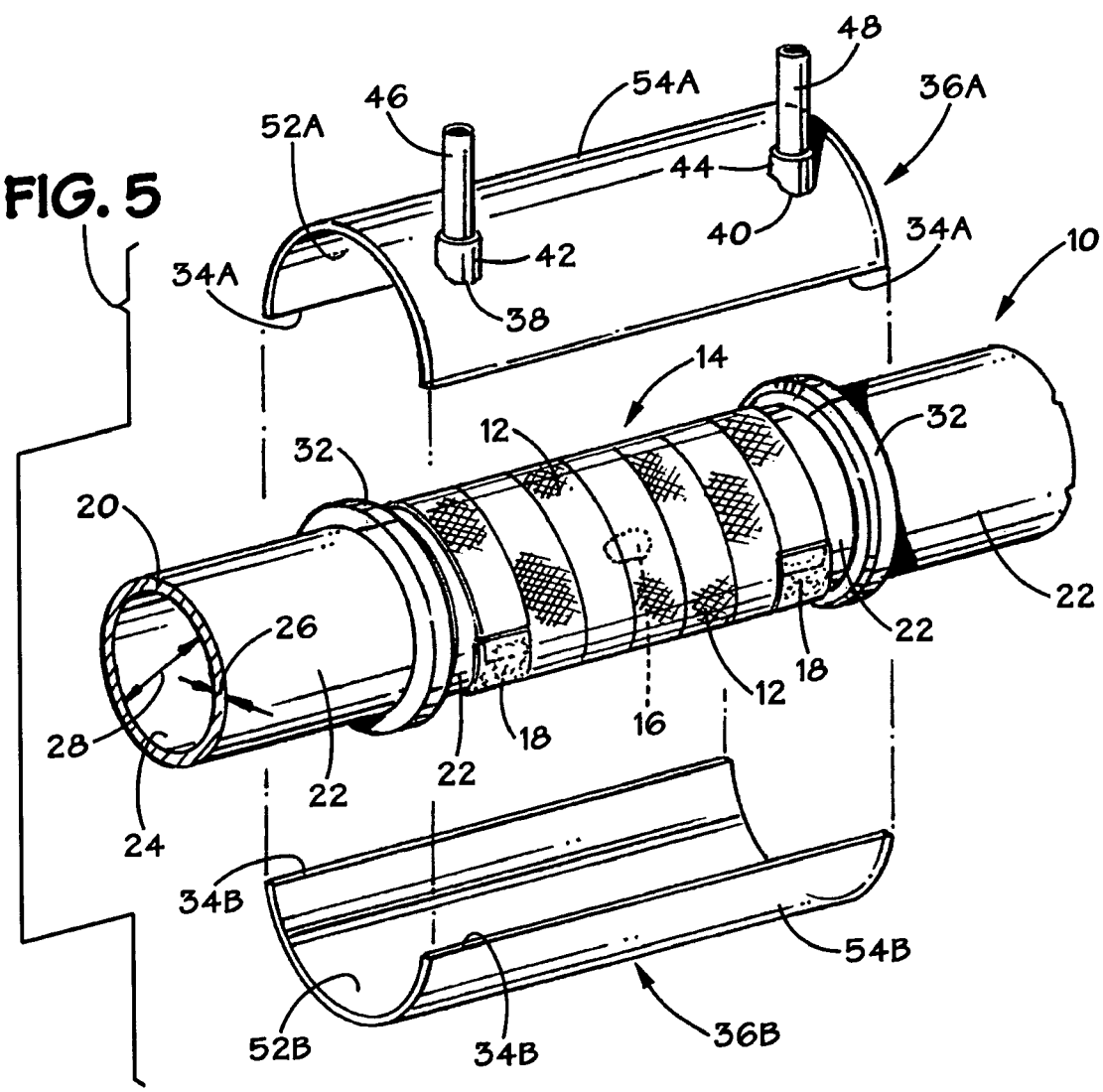
FIG. 5 is an exploded perspective view of the pipe of FIG. 3 illustrating an outer component (e.g., shell) for containing resin and having two halves.
Figure 6:
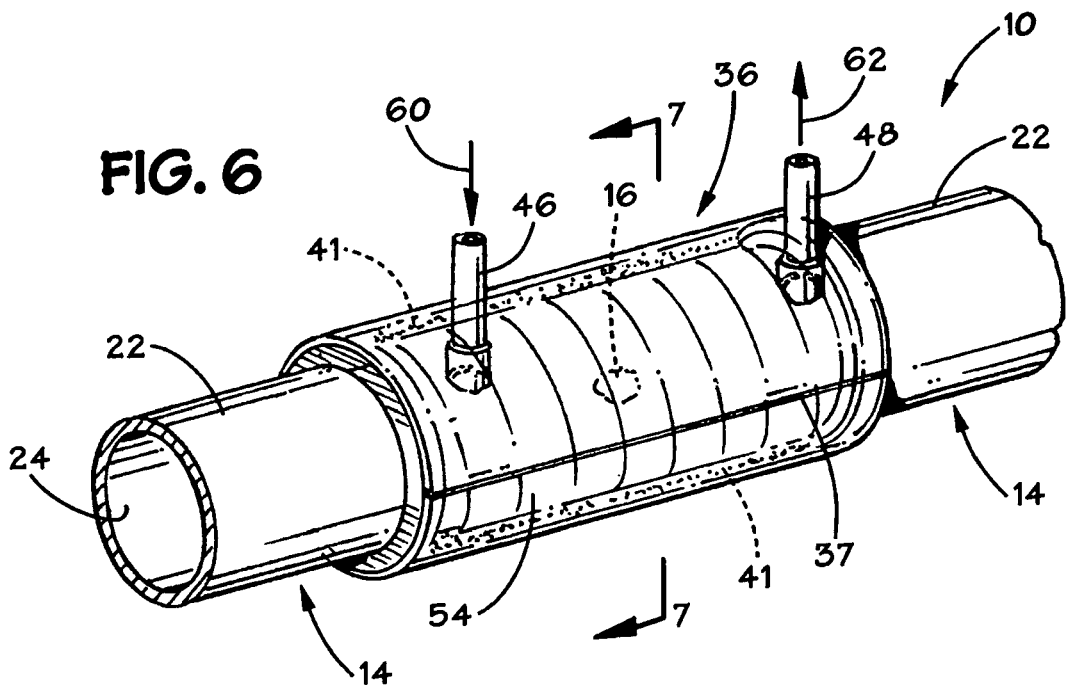
FIG. 6 is perspective view of the pipe of FIG. 4 having the outer component installed around the pipe and mating with the seals in accordance with an exemplary embodiment of the present invention.

Referring now to the method 1 depicted in FIG. 1 and the pipe repair depicted in FIGS. 4-6, seals or seal ends 32, such as flexible rubber strips, metal components, and other elements, may be installed at portions of the pipe 14, such as upstream and downstream of the wrapped and secured dry fiber structure 12 (block 4). Before or after the seals 32 are installed, a containment component 36, such as a sleeve, shell, box, container, and so forth, may be positioned around the portion of the pipe 14 having the dry fabric structure 12. The containment component 36 mates with the seals 32 to form a substantially sealable cavity between the inner surface of the containment component 36 and the outer surface of the pipe 14 and fiber structure 12 (block 5). Furthermore, the containment component 36 may be secured to the pipe 14, for example, by positioning a simple hose clamp or a more sophisticated fastener at each longitudinal end of the containment component (block 5). Such clamping devices on the containment component 36 may also facilitate compression of the seals 32 and thus advance the integrity of the seals 32.

The exemplary embodiments of FIGS. 4, 5, and 6 depict seals 32 disposed in the exemplary pipe repair system 10 toward each end of the section of the pipe 14 to be repaired. In this embodiment, the exemplary seals 32 (e.g., rubber strips) are flexible so that they may be wrapped around the pipe 14 and positioned longitudinally along the pipe 14 outside of the dry fiber 12 wraps. Again, a purpose of the seals 32 is to facilitate formation of a substantially sealable cavity between the section of pipe 14 that includes the dry fiber structure 12 and the inner surface of an outer Containment component 36. The cavity may receive a resin or other polymeric material that penetrates through the dry fiber structure 12 to the outer surface 22 of the pipe 14, ultimately curing into a composite repair of the pipe 14. It should be stressed that sealing configurations other than the exemplary seals 32 may be employed in the present techniques. For example, a foam material may plug the ends between the pipe 14 and the containment component 36. On the other hand, in pressurized containment component 36 systems, for example, more sophisticated seals, such as mechanical seals, may be employed, and so on.

An exemplary containment component 36 having two halves 36A and 36B is illustrated in FIG. 4. The halves 36A and 36B include end surfaces 34A and 34B which mate to encase the pipe 14 segment and the dry fiber structure 12. The containment component 36 may be constructed of thin metal (e.g., ⅛" sheet metal), piping (e.g., standard carbon steel piping), plastic, fabric, and so on. The containment component 36 is installed around the dry fiber structure 12 of pipe 14. In the illustrated embodiment, the two halves 36A and 36B of the containment component 36 are connected at end surfaces 34A and 34B of the containment component 36. The fastening element 37 that secures the two containment component halves 36A and 36B at the half end surfaces 34A and 34B may be welded, bolted, fastened, stapled, glued, and so on.

Moreover, it should be noted that the containment component 36 may instead comprise a single piece or more than two pieces, as well as a variety of configurations. Indeed, if it is decided to contain the resin 41, the containment component 36 may be fabric, pre-coiled metal tape, metal or plastic sleeves, cylindrical collars, clamps, hollow segments, and so on.

C. Apply Resin and Allow Resin to Penetrate the Dry Fiber Structure

Referring now to FIG. 1 and FIG. 6, during the repair, resin 41 may be poured inside the containment component 36 through openings or fill tubes, for example, with the resin 41 initially resting on top of the dry fiber structure 12 disposed on the pipe 14 (block 6). The resin viscosity, pot life, and other properties may be specified such that the resin penetrates into and around the fibers by gravity, by capillary action, or by applying pressure (block 7). In general, simply allowing the resin to impregnate the fibers by gravity and/or capillary action may provide for ease of installation relative to techniques in which the containment component 36 is pressurized to assist in resin impregnation of the dry fiber structure 12. However, additional pressure, as indicated, may be applied, such as with an external pumping mechanism (not shown), or by pushing or squeezing a flexible shell (e.g., fabric, plastic, etc.) against the resin, and so on. Ultimately, the resin cures to form a composite or matrix of the resin and fiber to repair the anomaly, advance the integrity of the piping system, and/or to restore operating pressure capability of the piping system (block 8).

To deposit the resin 41 into the containment component 36, openings 38 and 40 in the containment component 36, as illustrated in FIG. 6, may receive resin and/or displace air.

For example, a polymeric material or resin 41 may be poured into the opening 38, while air in the cavity within the containment component 36 escapes through the opening 40 as the air in the cavity is displaced by the incoming resin 41. Alternatively, a single opening in the containment component 36 instead of two openings, or more than two openings in the containment component 36, may be utilized to add resin 41. Furthermore, sealable openings at other portions of the repair system 10, such as at the seals 32, may be used to add resin 41 inside the containment component 36.

The openings 38 and 40 may comprise fittings 42 and 44 or other connectors configured to receive tubes 46 and 48 that facilitate the filling of resin 41 and/or the displacement of air. In the illustrated embodiment of FIG. 6, resin 41 is poured into opening 38 via fill tube 46, as depicted by reference arrow 60. Air is displaced from inside the containment component 36 out opening 40 via tube 48, as depicted by reference arrow 62.

It should be understood that the use of the containment member 36 is merely one example of how the resin 41 may be applied to the dry fiber structure 12 on the pipe 14. Other alternatives include applying the resin to the dry fiber structure 12 using a brush, for example, after the dry fiber structure 12 has been placed on the pipe 12. While this alternative does provide for containment of the resin, it provides a less expensive repair because the containment member 36 is not used.

D. Exemplary Layers of Pipe Repair

Figure 7:
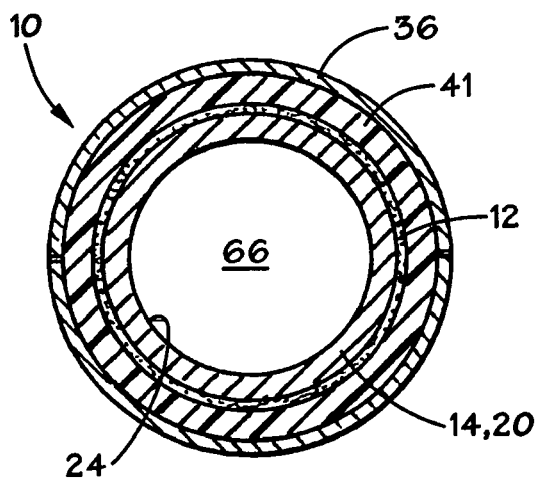
FIG. 7 is a cross-sectional view of the pipe of FIG. 5 taken along line 6-6 in accordance with an exemplary embodiment of the present invention.

The exemplary layers of the pipe repair system 10 are depicted in FIG. 7, a cross-sectional view of the pipe repair system 10 taken along section line 7-7 in FIG. 6. In the center of the cross-sectional is the pipe 14 having an inside surface 24. Upon completion of the pipe repair system 10, the initially dry fiber structure 12 disposed on the pipe 14 is substantially saturated with the now cured resin 41. Further, the cured resin 41 also sits atop the dry fiber structure 12 within the containment component 36. Together, the resin 41 and fiber structure 12 form a matrix or composite on the pipe 14 and within the containment component 36.

The containment component 36 may remain installed or be removed, depending on the particular application. To remove the containment component 36, the containment component 36 may be cut, the fastening elements 37 dismantled, and so forth. It should be noted that if the containment component 36 remains, it is typically the outer component of the repair system 10. In this case, the outer surface 54 of the containment component 36 is the outer surface of the pipe repair system 10. Again, however, the containment component 36 may be removed.

E. Repair of Pipe Elbows and Pipe Bends

Finally, it should be noted that the pipe repair system 10, as depicted in FIG. 8, may be advantageously applied to an elbow 142 of a pipe 144. Again, as with the pipe 14 of previous figures, the pipe 144 (and elbow 142) may comprise a portion of a pipeline 30 and include an outer surface 148 and an inner surface 150. However, as appreciated by those of ordinary skill in the art, the change in direction of the elbow 142 of the pipe 144 poses additional repair challenges. Nonetheless, the present techniques apply to repair of pipe elbows 142, other pipe bends, and other irregularly shaped objects in need of repair.

The containment component 146 depicted in this alternate embodiment may include openings 152 and 154 for pouring resin inside the containment component 146, as well as for displacing air from within the containment component 146. Furthermore, as previously discussed, the containment component 36 may include fittings 156 and 158 at the openings 142 and 154, as well as fill tubes and/or air tubes 160 and 162. Finally, though not illustrated, the pipe repair system 10 depicted in FIG. 8 will generally include the fiber structure 12 and resin 41 forming a composite over a anomaly on the pipe elbow 142, for example, under the containment component 146.

F. Containment Component Configurations and Fasteners

FIGS. 9 and 10 illustrate examples of how the containment component 36 may be secured in the pipe repair system 10. In FIG. 9, the containment component 36 may be a thin material, such as sheet metal or plastic, and so on, having flanges 80 that mate to piece the two halves 36A and 36B together. The flanges 80 have holes 82 configured to receive bolts 84 that mate with nuts 86. Optionally, a gasket material 88 having holes 90 may be used to improve the seal between the two halves 36A and 36B of the containment component 36. It should be emphasized that the containment component 36 may not comprise two separate halves, but instead comprise a single structure having a hinge on one side, for example, and enclosed with a flange on the other side.

As depicted in FIG. 10, the containment component 36 may be a single piece or wide strip of material. The containment component 36 may be a flexible or semi-flexible material, such as sheet metal, plastic sheet, fabric roll, and so on. To encase the portion of the pipe 14 to be repaired, the flexible containment component 36 strip is wrapped around the pipe 14. An end 100 of the containment component 36 strip overlaps the other end of the containment component 36. To better illustrate the detail of the overlap seal of the containment component 36 strip, FIG. 10A depicts an exploded view of the pipe repair system 10 showing the strip end 100 of containment component 36. To complete the installation of the containment component 36, a hose clamp 68 or other component may secure the containment component 36 strip wrapped around the portion of the pipe 14 having the dry fiber structure 12. Optionally, a sealing material 102 or resin 41 may further secure and seal the strip end 100 of the containment component 36 in the pipe repair system 10.

Figure 11:
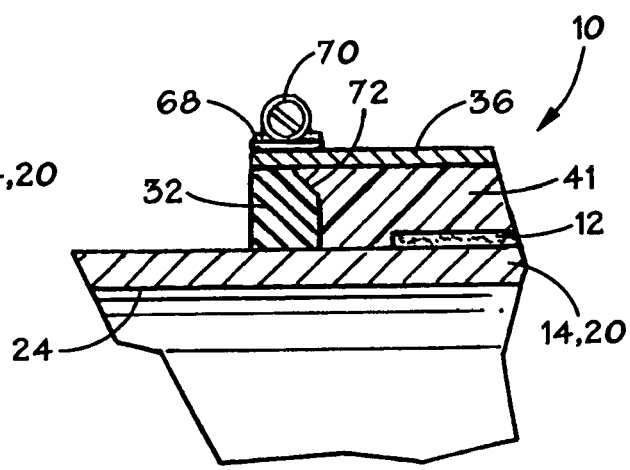

Referring to FIGS. 11 and 12, a cross section taken along section line A-A at an end of the pipe repair system 10 in FIG. 10 depicts exemplary stabilizing alternatives of the containment component 36. In FIG. 11, for example, a hose clamp 68 wraps around an end of the containment component 36 to secure the containment component 36 in the system 10. The clamp 68 may also further compress the seals 32 to reduce the potential for escape of resin 41 from the containment component 36. In the illustrated embodiment of FIG. 11, the hose clamp 68 has a typical screw 70 for tightening the clamp 68 around the containment component 36. Moreover, an optional surface 72 on the seal 32 may facilitate sealing of the resin 41 cavity.

Similarly, FIG. 12 depicts the pipe repair system 10 having features, similar to that of FIG. 11, however, with a lip 112 formed on the end of the flexible containment component 36. Such a lip 112, for example, may facilitate installation and positioning of the containment component 36, as well as advance the integrity of the seal 32, substantially preventing escape of resin 41 from the pipe repair system 10. Moreover, formation of such a lip 112 with a thin containment component 36 (e.g., sheet metal) may be relatively straightforward.

An alternate exemplary fastener 120 for fastening the containment component 36 around the pipe 14 is depicted in FIG. 13. The exemplary fastener 120 may be used with different types of containment components 36. For example, the fastener 120 may be used in lieu of the hose clamp 68 to secure a flexible containment component 36. On the other hand, the fastener 120 may be used to secure a more rigid and/or thick pipe-type containment component 36 in the repair system 10. Moreover, the fastening element 120 may be integral to or part of the containment component 36, and not an independent component.

The components of the fastener 120 may include two pieces, for example, having an outer surface 122. A hole 124 and receptacle 126 may be provided on one of the pieces of fastener 120 to receive a screw or bolt 132. In this embodiment, the screw 132 may enter the receptacle 126 through an interior tube 128 through hole 124 and with the threaded portion of bolt 132 received by the female threaded cavity 130 in the other piece of the fastener 120.

It should be emphasized that a variety of fastening elements, such as hose clamp 68, fastening element 120, welded elements, glue, adhesives, staples, flanges, bolts, screws, and other components, may be used to secure the containment component 36 in the pipe repair system 10. Such fastening components and elements may also provide compressive force of the containment component 36 against the seals 32 (e.g., seal ends) to provide for effective sealing of the resin within the cavity formed between the inner surface of the containment component 36 and the outer surface 22 pipe 14.

G. Resin/Fiber Embodiments of the Pipe Repair System

In certain embodiments of the pipe repair system 10, the reinforcing material is a dry fiber structure and the polymeric material is a resin (e.g., an epoxy system). Appropriately specified dry fibers and liquid resins provide for a self-developing composite formed on the pipe 14. In construction, one or more layers of a dry fiber structure 12 are applied or wrapped around the pipe 14. Resin 41 is disposed, applied, or poured on top of the fiber structure 12 (i.e., within an outer shell, for example). Significantly, no pre-wetting of layers of dry fiber structure 12 with resin 41 is required. Thus, the cumbersome handling and wet lay-up of a resin-saturated wet fiber may be advantageously avoided. Again, the properties of the resin 41 and dry fiber structure 12, as discussed, may be designated so that the resin 41 penetrates through the layers of the dry fiber structure 12 to the pipe 14 surface without the untidy hand lay-up of wet fiber saturated or impregnated with resin. Finally, it should be again emphasized that in addition to the repair or reinforcement of piping, the present techniques apply to the repair or reinforcement of vessels, vessel nozzles, other equipment, and so on.

Figure 14:
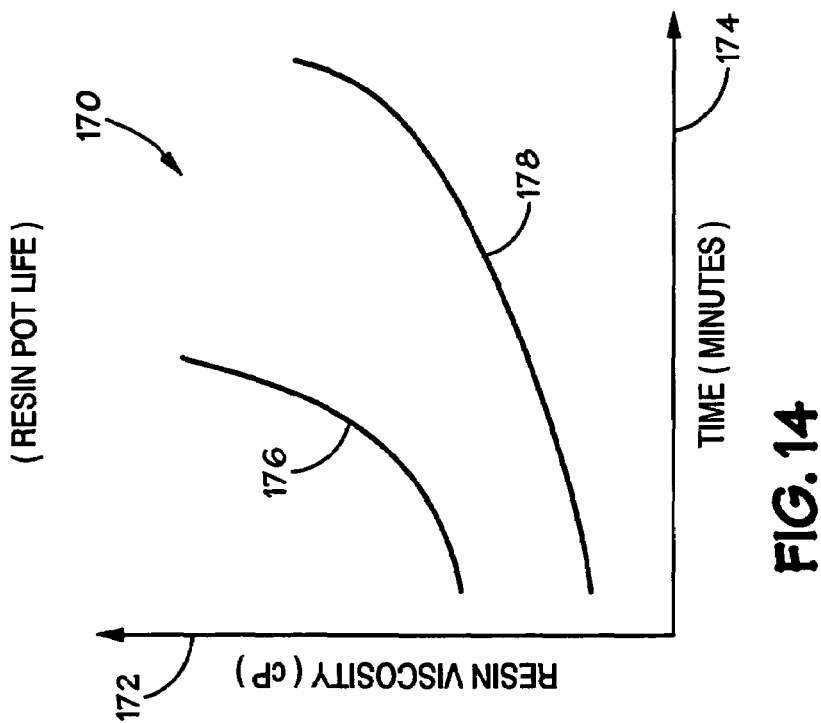
FIG. 14 is a plot of resin viscosity versus time, and is an indication of resin pot life in accordance with an exemplary embodiment of the present invention.

FIG. 14 is a plot 170 of resin viscosity 172 in centipoises (cP), for example, versus time 174 in minutes, for example. The plot 170 may be representative of the pot life of the particular resin. The pot life of a resin may be a measure of the point at which the viscosity of the resin increases to where the resin can no longer be readily manipulated, molded, and applied to a dry fiber structure, and so on. In certain embodiments, the exemplary initial viscosity values of the resin prior to expiration of the resin pot life may be in the ranges of 1100 to 1200 cP, 1200 to 1500 cP, 1100 to 1500 cP, 1000 to 1600 cP, and 1 to 10,000 cP (e.g., 1 cP, 5 cP, 20 cP, 50 cP, 100 cP, 300 cP, 500 cP, 1000 cP, 1100 cP, 1150 cP, 1200 cP, 1250 cP, 1300 cP, 1350 cP, 1400 cP, 1450 cP, 1500 cP, 2000 cP, 3000 cP, 4000 cP, 5000 cP, 7000 cP, 9000 cP).

In the illustrated embodiment, the plot 170 shows two curves 176 and 178. Curve 176 is a representation of a typical resin employed in composite repair of piping. The typical resin tends to increase in viscosity fairly rapidly (and exponentially) with a short pot life. In contrast, curve 178 represents a resin or polymeric material that may be more appropriate for the present techniques in that the resin viscosity increases at a slower pace having a higher pot life (e.g., 20-200 minutes), and thus, in part, allows for the resin 41 to penetrate through the dry fiber structure 12 prior to a significant viscosity increase. However, it may be beneficial to define a window of pot life time, because excessive pot life may result in leakage of the resin from the pipe repair system 10, excessive repair time, and so on.

Exemplary components and their properties for a resin 41 system for the present technique are given in Table 1 below. It should be noted that the resin 41 may include prepolymers, hardeners, polymeric resins, and so on. Indeed, a resin 41 system may typically include the resin (i.e., a prepolymer which cures to a polymer) and a hardener that facilitates curing (i.e., crosslinking into a thermoset). Shown in Table 1 is a compendium of formulations depicting the nature of components, their contribution and exemplary weight levels used in typical formulas. It should be emphasized, however, that the present techniques may employ candidate resin systems outside of the tabulated ranges and properties.

The exemplary information in Table 1 demonstrates an exemplary compromise between various properties of low viscosity, strength, hardness, wetting and reactivity to obtain suitable resin candidate systems (including the resin and hardener) for the pipe repair composite. A consideration is the potentially conflicting needs of low viscosity components while maintaining adequate strength of the composite. Moreover, there is a certain importance to the reactivity of the curing agent or hardener (e.g., polyamines) used in the resin 41. A combination of fast polymerization with extended pot life may allow for cure to happen quickly while allowing enough pot life so that the resin 41 adequately penetrates through the fiber 12. In certain examples, attention may focus on lower molecular weight items so that wetting is improved and not as quickly reduced upon reaction of resin 41 and hardener. Ultimately, upon resin curing, composite strength is measured, for example, by tensile properties of the composite. Further, hardness of the composite may also be an indicator of the integrity of the composite structure.

TABLE 1

EXEMPLARY RESIN/POLYMER RANGES AND FUNCTIONS

| Material | Viscosity | MW | Function | Amount (%) |
| --- | --- | --- | --- | --- |
| DGEBPA | 13,000 cps | Approx 380 | Hardness, Strength, moderate reactivity | 25.5-67 |
| NPGDGE | 18 | ~280 | Low viscosity, difunctional | 0-9 / 6-9 |
| Xylene | <1 | 106 | Wetting and low viscosity | 0-0.5 |
| CHDMDGE | 65 | ~340 | Low viscosity, difunctional | 0-25.5 |
| Cyclic Ester | 2 | ~90 | Wetting, low viscosity and reactivity | 0-3 / 2-3 |
| Modified DGEBPA | ~250,000 | ~400 | Increased reactivity, strength | 0-9 |
| Modified Amine | 50 | Mixture of amines | Low viscosity, slow even reaction | 0-16 |
| Aliphatic Amine | 20 | ~160 | Low viscosity, moderate reactivity, strength | 0-5.5 |
| Modified amine w/ aromatic content | 2000 | >300 | Good low temperature cure with moderate strength | 0-19 |
| Polyether amine | 80 | >300 | Low reactivity, wetting | 0-17.5 |

DGEBPA = Diglycidyl ether of Bisphenol A
NPGDGE = Neopentyl glycol diglycidyl ether
CHDMDGE = Cyclo hexane dimethanol diglycidyl ether II. Piping Anomalies and Surveys The failure, potential failure, or anomaly 16 of the pipe 14 to be repaired may include corrosion, erosion, pitting and so forth that may reduce the wall thickness and thus, the pressure rating of the pipe 14 and the associated pipeline 30. Such a failure or anomaly 16 may be detected, for example, by a variety of survey and testing techniques discussed below. The failure or anomaly 16 may be defined by depth, area, volume, axial and radial dimensions, and other dimensions and measures. In the illustrated embodiment of FIG. 2, the failure or anomaly 16 is formed on the outer surface 22 of the pipe 14. However, it should be emphasized that the present techniques also apply to mitigating internal failures or internal potential failures 16 of the pipe 14.

Piping anomalies 16 may be caused by corrosion, erosion, mechanical damage, and so forth. Corrosion may be characterized as a chemical or electrochemical reaction that propagates over the exposed surface of the pipeline, resulting in failures or potential failures and thinning the metal wall. External corrosion may be caused by the heterogeneous nature of soils for underground piping, and by chemical attack from the environment for above-ground piping, for example. Internal corrosion of piping may be caused chemical attack of the piping contents on the inside surface of the pipe. Corrosion may be advanced due to the presence of a localized blemish, such as gouge or scratch in the pipe 14 surface or coating. Moreover, internal erosion may occur due to the flow of the contents through the pipeline. Such erosion may be exacerbated by the presence of particulates in the flowing contents, or by a change in the direction of the flow of the contents through the pipeline, such as at a piping elbow or tee, for example. Furthermore, mechanical damage, such as inadvertently striking an underground pipeline while digging may result in an anomaly on the pipe 14. In any case, whether internal or external corrosion/erosion, or mechanical damage, a resulting reduction in the wall thickness 26 of the pipe 14 may unfortunately reduce the pressure rating and/or pressure-holding capacity of the pipe 14 or pipeline 30. As might be expected, operation of an excessively damaged pipeline 30 may be problematic, necessitating the repair, replacement, or abandonment of the pipeline.

In general, the operations and maintenance personnel of piping systems may determine if a failure or anomaly 16 discovered in a pipeline 30, for example, should be repaired or if a section of the pipe 14 should be replaced. Without a doubt, there is an ever increasing need in the industry for pipe repair techniques that cost-effectively identify and repair the failure or anomaly 16. On the whole, examples of anomalies 16 include localized and generalized imperfections, gashes, gouges, scratches, mechanical damage, erosion, internal and external corrosion, and so on. In general, objectives of pipeline 30 inspection may include the detection of and sizing of anomalies 16 (e.g., cavities, pits, corroded areas, stress cracking, etc.), and so on. The analysis may determine the number, size, depth, and axial length of the potential failure or anomaly 16 to decide on the required action, such as if the pipe needs to be repaired or replaced.

Operators, technicians, engineers, maintenance personnel, service providers, and so forth, may utilize both external and internal surveys to determine and evaluate the condition of pipeline 30 and its anomalies 16, failures, or potential failures to determine if pipe 14 should be repaired or replaced. Survey techniques may include cathodic-protection potential surveys to evaluate the effectiveness of external corrosion control system (e.g., coatings) installed on pipelines 28, such as transmission pipelines. Low potentials recorded during these surveys may be indicative of coating damage, for example. A follow-up external coating analysis may pinpoint areas of coating damage on the pipeline 30. In general, areas of coating damage may be at high risk for active corrosion. Other survey techniques include the use of internal tools, such as intelligent pigs which are also called online inspection tools and smart tools. As appreciated by those of ordinary skill in the art, intelligent pigs are devices routed through pipelines and having sensors to detect metal variations of the pipeline. Additional testing techniques include an ultrasonic thickness gauge, which may be employed to measure either internal or external corrosion. Furthermore, basic measurement tools for external corrosion include straight edges or rulers, pit gauges, scales or profile gauges, bridging bars, and so on.

Pipeline information generated from internal and external survey techniques may include data on the piping welds, branch connections, valves, wall thickness changes and losses, anomalies, failures, potential failures, and so forth. Moreover, repair standards established by the American Society of Mechanical Engineers (ASME) and other organizations and authorities may provide for the assessment and analysis of pipeline corrosion and anomalies, measurement techniques, and engineering calculations, such as for the calculated burst pressure (or remaining pressure capacity) of the corroded pipe 14. In general, if the remaining pressure carrying capacity exceeds the maximal allowable operating pressure (MAOP) by a sufficient margin, the inspected segment or pipe 14 may remain in service.

Variables in such calculations and other considerations that may be obtained and analyzed prior to making a repair decision include the pipe 14 dimensions, yield strength, anomaly depth, anomaly axial length, geometric shape factor, installation pressure, pipeline MAOP, class location, and other applicable pipeline company standards. Furthermore, the operator or service provider may consider the pipeline 30 location, anomaly 16 location on the pipe 14, and the type of anomaly 16. Of course, a repair application may be conditional or modified per the manufacturer or special requirements. Ideally, it is generally desired that the repair meet or exceed the strength of the pristine pipe 14 and allow the pipeline 30 to return to service at 100% of is maximum allowable operating pressure (MAOP).

III. Exemplary Reinforcing Materials

In pipe composite repair, the tensile properties of the repair beneficial to restoration of the 100% MAOP are typically primarily promoted by the reinforcing fiber element of the system, such as the exemplary dry fiber structure 12 depicted in FIGS. 2 and 3. The dry fiber structure 12 may be constructed of a variety of materials, such as glass, advanced polymers, carbon, polyester, polyacrylics, polypropylene, Nylon (polyamide fibers), organic materials such as Kevlar, inorganic materials such as ceramic, and other materials. In general, the dry fiber structure 12, such as a fiber mat or tape, may be configured to receive a polymeric material such as a resin 41 or adhesive to form a fiber-reinforced composite. For example, the dry fiber structure 12 may have a weave structure to facilitate formation of a matrix or composite when the polymeric or resin 41 material is applied to the dry fiber structure 12.

Many types of fibers, such as glass fibers, carbon fibers, and others, may be utilized in the present techniques. Particularly beneficial fibers (i.e., for stiffness, strength and application properties) are carbon fibers. Many forms of carbon fiber may be used. An exemplary form of useful carbon fiber is woven tape. An advantageous tape construction may be unidirectional carbon (warp) with some other non-structural or less structural fiber (glass or polyester) in the weft direction. Exemplary manufacturers of beneficial fibers include: Zoltek, Torah, Cytec, Hexcel (Hercules), Toho, Mitsubishi and Grafil. Exemplary tensile strength ranges of fibers utilized in the present techniques include 350 to 800 thousand pounds per square inch (KSI), e.g., 400 KSI, 500, KSI, 600 KSI, 700 KSI, etc. Fibers with a modulus of greater than 25 million pounds per square inch (MSI) are also effective, for example. However, it should be emphasized that lower and higher tensile strengths and moduli can effectively be implemented with the present techniques.

Further, it should be noted that fiber tapes and other fiber structures can be manufactured with a number of constructions. For example, in certain embodiments, the fibers of the dry fiber structure 12 may be unidirectional or omni-directional. Exemplary fibers may be made with carbon tows (a collection of carbon monofilaments defined as a yarn) made up of 1000 to 50,000 monofilaments woven in various ways to obtain the fiber content and structure desired. A more particular example is a 3-inch tape having 12 warp yarns/inch, constructed from yarn having 12,000 monofilaments/inch of fiber having a weight of 12 ounces per square yard. In yet another example, the dry fiber structure 12 is a plain-weave carbon fabric constructed with 12,000 monofilaments/inch in a hoop direction and 63,000 monofilaments/inch in the axial direction. In general, the weave structure and other properties of the fiber 12 may be specified to facilitate penetration of polymeric material (e.g., resin 41) into the dry fiber structure 12.

In the illustrated embodiments, application of the dry fiber structure 12 to the pipe 14 is straightforward because the dry fiber structure 12 may be installed dry without pre-wetting of the dry fiber structure 12. For example, the dry fiber structure 12 (e.g., a carbon fabric reinforcement) is not wetted with polymeric material, such as an epoxy or other resin, prior to applying the dry fiber structure 12 to the pipe 14. Moreover, it should be noted that the failure or anomaly 16 of the pipe 14 may be filled with a filler material prior to applying or wrapping the dry fiber structure 12 around the pipe 14. Further, the number of wraps or layers of the dry fiber structure 12 around the damaged pipe 14 may depend on the desired pressure rating or desired maximum allowable operating pressure of the repaired piping system. Engineering properties of the dry fiber structure 12 which may be considered include the ultimate tensile strength and modulus in the longitudinal and transverse directions of the dry fiber structure 12 (and ultimately the repaired pipe 14). Properties of the cured composite to be considered may include shear strength, glass transition temperature, and the coefficient of thermal expansion, and so on. Finally, as appreciated by those of ordinary skill in the art, the completed repair system 10 may be subjected to a variety of testing to determine the in-service integrity of the system 10.

IV. Polymeric Repair Material

Exemplary polymeric materials applied to the reinforcing material (e.g., dry fiber structure 12) may include thermosets or resins 41, such as phenolic resins, epoxy resins, polyurethanes, amino resins, Nylon, polycarbonates, and so on. Indeed, exemplary fluid resins 41 include an epoxy system, a polyester system, a vinyl ester system, a urethane system, or a methacrylate system, or any combination thereof. Exemplary thermoplastics that may be utilized as resin 41 include polyethylene, polypropylene, polyvinyl chloride, polystyrene, and other thermoplastics. Further, it should be noted that the polymeric material or resin applied to the fiber structure 12 may initially be a short chain prepolymer molecule. For additional details of exemplary materials and exemplary property ranges, refer to Table 1.

In the case of epoxies, the epoxy resins generally refer to a family of molecules or oligomers containing at least one epoxide group. Common epoxy resins include glycidyl ethers of alcohols or phenolics. Liquid epoxy resin is the typical diglycidyl ether of bisphenol A (DGEBA) and represents a majority of the resin used in industrial applications. These products are solid or liquid with varying consistencies and have the ability to react via the epoxy end-groups to generate three dimensional networks providing the final material with rigidity, hardness and the inability or substantial inability to reflow. The final products may be characterized by their electrical properties, adhesion (i.e., facilitated by the presence of polar groups in the epoxy), shrinkage, impact resistance, moisture resistance, and so on. This family of thermosets is used in many applications like composites, coatings, adhesives and encapsulating materials. The epoxide group on the end of these molecules serves as the reactive site for crosslinking in these thermoset polymers. It should be noted that other thermosets without epoxide end groups may also be employed with the present techniques. For example, urethane prepolymers containing (e.g., ending with) isocyanate groups may be employed. Further, polyesters having unsaturated groups may be used in the pipe repair system 10. As previously emphasized, a wide variety of polymer and resin systems may be configured for use in the repair system 10.

The chemical chosen to react with these epoxides and other resins or thermosets is referred to as the curing agent (or hardener), and it typically has active hydrogen attached to nitrogen, oxygen, or sulfur. Commonly, the active hydrogen is either attached to nitrogen or part of a mercaptan (—SH) group. In the case of epoxy resins, amine curing agents are the most common and can be primary or secondary, aliphatic or aromatic, or cycloaliphatic. The amines typically have greater than three reactive sites per molecule that facilitate the formation of a three-dimensional polymer network when mixed with the epoxy resin. The selection of the curing agent depends on many parameters and may determine, to a large extent, the performance of the final epoxy thermoset. Moreover, while the reaction of amines and epoxides may take place at ambient temperature, care should be taken in the selection of the curing agent to insure that a complete reaction takes place. Amines designed for ambient temperature applications may employ plasticizers to insure complete reaction. Furthermore, amines designed for heat-cured reactions may use little or no plasticizers and typically give thermosets with higher strength and thermal performance.

Chemical cross-linking generally starts as the epoxy resin and non-latent curing agents are mixed. Curing agents may be slow to react with epoxies, such as aromatic amines or anhydrides, and may maintain low viscosity in larger masses or if heated. Aliphatic amines, cycloaliphatic amines and amidoamines, however, may increase in viscosity rapidly, proportional to the total formulation mass. Curing agents, such as certain cycloaliphatic amines, amidoamines, aliphatic amines, and tertiary amines, etc., may be added to the formulation to extend the resin 41 pot life slow the viscosity build. As mentioned, processing temperatures may play a significant role in determining the properties of the final composite. Moreover, the times and temperatures employed may depend on the curing agent selection.

In general, a composite may include a material reinforced by fibers or other elements with a discernable aspect ratio of length to thickness. Common fibers employed with epoxies are glass and carbon. However, aramid, boron, and other organic and natural fibers, as previously indicated, may also be used. Polymers used in composites are typically thermosets, and their purpose is to transfer the load or stresses to the fiber reinforcement in order to take advantage of the strength and stiffness (modulus) of the fibers. Exemplary fiber fractions of the cured composite (i.e., the total composite including additional resin applied on top of the fiber to facilitate impregnation) may range from 8% to 80% (e.g., 10%, 20%, 30%, 40%, 45%, 50%, 55%, 60%, 65%, 70%, 80%), such values in weight percent. Of course, such percentages will be generally higher if only considering the substantially function portion of the composite and not the additional resin. The specified weight percent of the fiber may be based on the desired strength, pressure rating, and other factors of the particular application.

The final physical, thermal, electrical and chemical resistance properties of the composite may be determined by the choice of fiber, resin, curing agent, etc., and on the cure conditions. In epoxy systems, the parameters to consider in the selection of the appropriate curing agent for an epoxy resin formulation are viscosity, mass effect, curing cycles, glass transition temperatures, fracture toughness, and other factors. The viscosity of the formulation should be low enough to substantially penetrate the reinforcing fibers 12.

Mixtures of epoxy resin and curing agents having relatively higher viscosities may be heated to lower the formulation viscosity. However, heating may reduce the working time by accelerating the reaction depending on the type of curing agent.

V. Pipe Repair Utilizing Reinforcing Containment Over a Pliable Mold

A. Reinforcing Containment

In the present pipe repair techniques, a reinforcing containment may be applied over a pliable mold to be filled with resin. As discussed above, initially a fiber structure (e.g., without resin) may be wrapped around a surface of the pipe or object to be repaired. A soft or pliable mold (e.g., fabric mold) may then be disposed about portion of the pipe having the fiber structure (e.g., carbon fibers) disposed thereon. The reinforcing containment may be positioned around the fabric mold (i.e., to support the fabric mold), and resin introduce through the reinforcing containment to inside the pliable mold. The resin may then be pressurized to facilitate saturation of the resin into the fiber structure to form a polymeric composite. The reinforcing containment (i.e., a support structure) supports the pliable mold, promotes even distribution of resin around the pipe under the mold, facilitates control of resin thickness within the pliable mold, and so forth.

The reinforcing containment may be a substantially rigid cylindrical shell constructed of steel or polyvinylchloride (PVC), for example. On the other hand, the reinforcing containment may be flexible cylindrical shell formed from sheet metal, for example. In other embodiments, the reinforcing containment may include the tambour discussed below. In general, the reinforcing containment may provide flexibility in the radial direction (to wrap around the pipe), while providing stiffness in the axial direction to maintain a substantially uniform annulus around the pipe.

FIG. 15 depicts a tambour 180 used in the polymeric repair or polymeric reinforcement of pipe, vessels, and other objects. The exemplary tambour 180 having an inside surface 181 may be installed around the pipe or object to be repaired or reinforced, and, in certain embodiments, adjusted in length or width to fit the desired sized pipe or object, and so on. The tambour 180 may be used to provide a substantially uniform annulus around the pipe circumference where reinforcement fiber (e.g., carbon fibers), resin, and other components (e.g., pliable mold) of the pipe repair systems reside. The tambour 180 may remain in place or be removed at repair completion, i.e., after formation of the fiber-reinforced resin composite on the pipe.

In the present application, a tambour 180 may be defined as a flexible or semi-flexible structural containment element having a plurality of relatively narrow sections or members 182 (e.g., strips, slats, extrusions, etc.). The members 182 may be rigid, semi-rigid, or flexible, and constructed of aluminum, steel, wood, flat sheet metal, corrugated sheet metal, PVC, polyethylene, fiberglass, or workable materials, etc. In general, the slats or members 182 may provide flexibility in the radial direction while providing stiffness in the axial direction.

In the illustrated embodiment, the members 182 coupled together via connectors 184. In this example, end caps 186 secure the members 182 to one another. The height of the base of the connectors 184 may determine the thickness of the underlying resin disposed on the repaired pipe. Other elements or guides may be employed on or around the tambour to facilitate control of the resin thickness.

In one embodiment, the tambour 180 includes a plurality of interlocking members 182 (e.g., slats) made of aluminum which provides flexibility for wrapping the tambour 180 around the pipe circumference, but also provides stiffness in the axial direction to maintain a substantially uniform annulus around the pipe. It should be emphasized, however, that the specific tambour 180 depicted in FIG. 15 is exemplary and not meant to limit the present techniques to a specific construction.

The illustrated tambour 180 has a width 188 and a length 189, each of which may be modified or adjusted. For example, the length 189 may be adjusted by adding or removing members 182. Further, an end gap span device 190 may also facilitate adjustment of the length 189 of the installed tambour 180. The desired width 188 may be specified via the length of the narrow members 182, which in this example is the axial direction of the tambour 180 when installed around the pipe. The tambour 180 may be secured around the pipe via a coupling system, for example. In the illustrated embodiment, male couplings 192 mate with female couplings (see FIG. 16) to secure the tambour 180 around the pipe.

Again, however, it should be emphasized that the specific type of tambour 180 depicted in FIG. 15 is only given as an example. In other embodiments, the tambour 180 may not accommodate size adjustment, for example. Further, the slats 182 may couple differently than that discussed above, such as by hinges, shock-cord, laces, hooks, etc. In addition, the tambour 180 may be secured around the pipe differently than the specific coupling system employed in the illustrated embodiment. For example a tambour 180 may be secured via tie wraps, bands, Velcro, locking mechanisms, various types of bolting, and so forth. Moreover, again, it should be stressed that the various types of tambour 180 are only a category of the reinforcing containment. In other words, a reinforcing containment of the present techniques may not employ such slat members 182, but instead be a solid sheet of metal, for example, and which may provide flexibility in the radial direction and stiffness in the axial direction.

B. Pliable Mold

The tambour 180 (or other types of support containment or reinforcing containment) may be employed in a pipe repair system. For example, as discussed, a fiber structure (e.g., without resin) may be wrapped around a surface of the pipe. In certain embodiments, a soft or pliable mold (e.g., fabric mold) may then be disposed about portion of the pipe having the fiber structure disposed thereon. The tambour 180 (or other support containment or reinforcing containment) is then positioned around the fabric mold. Polymeric resin may be introduced through the tambour 180 (e.g., through opening 194) and through a funnel or opening in the fabric mold to the fiber structure disposed on the pipe or object. In the depicted example, the exemplary opening 194 of the tambour 180 includes an exemplary portion 195 for introducing the resin and exemplary portions 196 for receiving instrumentation or gauges, for example, such as temperature gauges, pressure gauges, etc.

The tambour 180 (or other embodiments of support containment or reinforcing containment) may provide for a shape and profile of cured polymeric resin underlying the fabric mold. Indeed, the tambour 180 may strengthen and support the fabric mold which may be of lower strength and of less expensive construction in certain embodiments. The tambour 180 may provide for a high strength mold with an inexpensive fabric mold without significant rupture or leakage.

Therefore, the tambour 180 (or other embodiments of support containment or reinforcing containment) may be a flexible, mechanical device to cover the outside of a fabric mold installed on a pipe, vessel, structure, tank, or other object. In implementation, the fabric mold under the tambour 180 may be compressed (e.g., squeezed, twisted, tightened, etc.) to pressurize the resin into the fiber structure, and thus substantially saturate the underlying reinforcing fabric material with the resin. The tambour 180 may provide support of the pliable mold, for example, such that the pliable does not deform significantly which could cause the resin to non-uniform or thicker at the bottom of the mold (i.e., because of the weight and gravity). Indeed, such support and control via the tambour 180 may beneficially reduce the amount of resin used in the repair. The tambour 180 may provide thickness control of the resin, reduce waste of resin via control of the underlying pliable (e.g., soft fabric), and the like. Lastly, it should be noted that the tambour 180 may be employed in pipe repair systems that do not employ an underlying pliable mold.

C. Tambour

FIG. 16 depicts an outside surface 200 of tambour 180 having slats 182. Again, an opening 194 is provided for receiving resin and/or instrumentation through the tambour 180 to the underlying fiber composite. As discussed, the tambour 180 includes both male couplings 192 and female couplings 202 to secure the tambour around the pipe or object. However, as mentioned, the tambour 180 may be secured around the pipe or object by tightening belts, tie wraps, mechanical clamps, bolting, and so on, in lieu of or in addition to the couplings 192 and 202.

FIGS. 17 and 18 depict an exemplary male coupling 192 and female coupling 202, respectively. In this example, the male couplings 192 are disposed at an end 210 of the tambour 180, and include a threaded bolt 212 supported by base 214. A connector 216 facilitates attachment of the male coupling 192 to an extrusion or slat 182 at an end 210 of the tambour 180. A spacer 218 is disposed at the base of the threaded bolt 212 to provide a stop for the nut 220. Nuts 220 and 222, which are situated on the threaded bolt 212 on each side of a washer 224, secure engagement of the male coupling 192 to the female coupling 202 which is disposed at the opposite end 238 of the tambour 180. In this embodiment, clip 216, crew 228, and spacer 229 engage connector 216 to secure the male coupling to a slat 182. Moreover, a standoff height 239 of the connector provides for resin thickness control.

FIG. 18 depicts the end 238 of the tambour 180 having female couplings 202. In this example, the end 238 also incorporates an end gap span device 190 used to adjust the installed diameter of the tambour 180 (around the pipe or object). In the illustrated embodiment, a screw 240 secures the female coupling 202 to a slat 182 at the end 238 of the tambour 180. Lastly, it should be emphasized the coupling configuration depicted in FIGS. 17 and 18 is given as an example and not meant to limit employment of other techniques for securing the installed tambour 180.

In FIGS. 19A and 19B, a male coupling 192 and female coupling 202 are engaged. A groove 242 of the female coupling 202 receives the threaded bolt 212 of the male coupling 192. The groove 242 includes lips 244, each having an outer surface 244 and inner surface 246. As depicted, the bolt 212 rests inside the groove 242. The couplings 192 and 202 may be further secured by tightening of the nuts 220 and 222, and via use of a washer 224.

Figure 21:
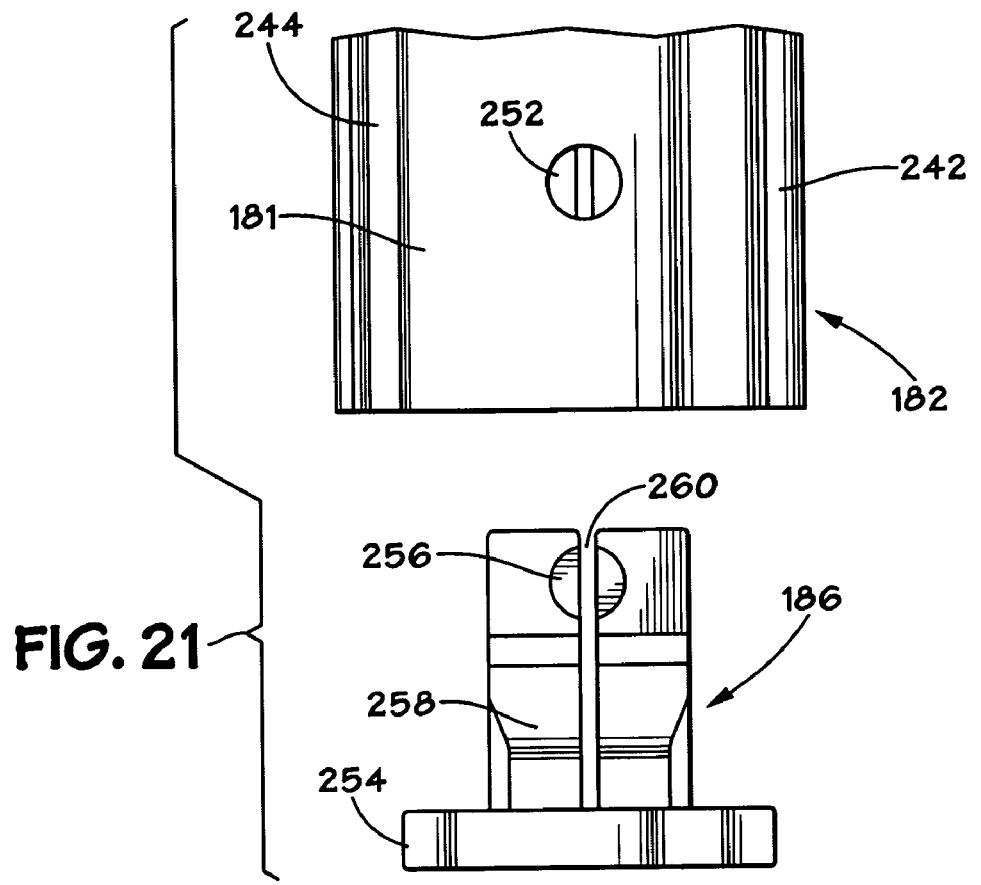
FIG. 21 is an end view of two extrusion slats of the tambour having a hinged design.
Figure 20:
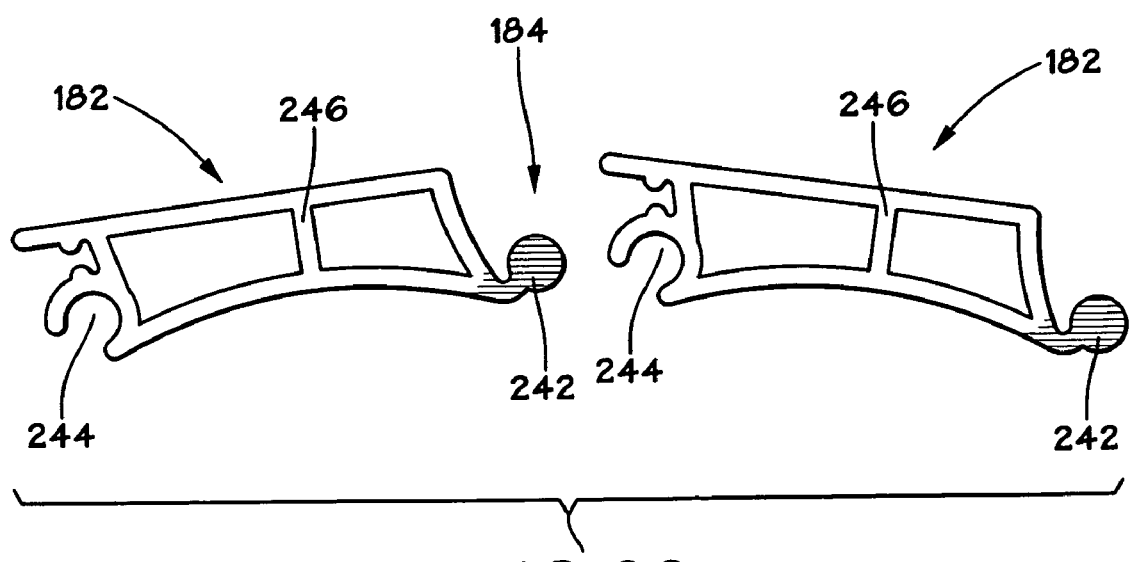
FIG. 20 is a perspective view of an end cap for locking the extrusion slats of the tambour in accordance with an exemplary embodiment of the present invention.

FIGS. 20 and 21 illustrate details of the connectors 184 and end caps 186, respectively for securing adjacent slats 182 of the tambour 180. FIG. 20 depicts two extrusion slats 182 with connectors 184 having a hinged design. The hinge of the connectors 184 includes a male part 242 and female part 244. Adjacent slats 182 may be coupled via the connectors 184 by sliding the male part 242 through the female part 244. FIG. 21 depicts the end cap 186 for locking the extrusion slats 182 of the tambour 180. After insertion of the end cap 186 into an end of the slat 182, the base portion 254 may provide for control of the resin thickness (i.e., act a resin thickness guide). Other types of resin thickness guides may also be employed with the present techniques. As discussed, to lock adjacent slats 182, the end cap 186 is inserted into an end of the slat 182. A locking hole 252 on the slat 182 mates with the locking detent 256 on the end cap 186. A tongue 258 of the end cap 186 includes a slot 260 which fits around the rib 246 of the extrusion slat 182.

D. Pipe Repair System

FIGS. 22A-22H' generally illustrate techniques for repairing an object or pipe 270. FIGS. 22A and 22A' depict a pipe 270 having an outer surface 272, an inner surface 274, and a defect 278 (e.g., damaged portion, corroded area, etc.) on the outer surface 272. In certain embodiments, the defect 278 and surrounding area 280 (as denoted by the dotted area) may be sand blasted or otherwise treated in preparation of further repair of the pipe 270. The area 280 around the defect 278 may be sand-blasted locally or around the entire outer circumference of the pipe 270.

In FIGS. 22B and 22B', a dielectric wrap 284 (e.g., fiberglass material) may be optionally disposed on the outer surface 272 of the pipe 270. The dielectric wrap 284 may serve to reinforce or strengthen the pipe 270, and also to insulate the pipe 270 (e.g., steel pipe) from subsequent layers of fibers or fiber cloth (e.g., carbon fiber cloth). Indeed, the wrap 284 may electrically insulate the pipe 270 (e.g. steel pipe) from carbon fibers that may be later applied, therefore inhibiting undesirable corrosion between the surface 272 of the pipe 270 and the subsequent carbon fibers. It should be noted, however, that a dielectric or electrically insulating primer can be used in lieu of or in combination with the electrically insulating (e.g., fiber glass, material).

FIGS. 22C and 22C' depict the application of a calculated number of wraps of reinforcing fiber cloth (e.g., carbon fibers) hand-tight around the pipe 270. A single layer or multiple layers of the carbon fiber cloth 290 may be applied or wrapped around the pipe 270. As discussed, the fiber 290 may include a variety of different types of fibers and materials. In one example, the utilized carbon fiber structure is a multifilament continuous tow (e.g., 12K) of plain weave style (e.g., having a fabric areal weight of about 300 gsm and nominal thickness of about 0.022 inches). An exemplary supplier of carbon fiber structure is Fabric Development, Inc. of Quakertown, Pa. It should be stressed that these particular numerical values of fiber properties are only given as an example.

FIGS. 22D and 22D' depict the installation of a pliable mold 300 (e.g., soft, flexible) around the carbon fiber 290 disposed on the pipe 270. The pliable mold 300 may be manufactured of fabric or other substantially non-porous material. Bands 302 or other means secure the soft fabric mold 300 to the pipe 270. Again, the pliable mold 300 may be secured and sealed in place using band clamps 302 on each end of the mold 300. The soft mold 300 may include a cloth funnel 304 and openings 306 for associated instrumentation. For example, a pressure gauge 308, a temperature gauge 309, or other instrumentation, may accompany the soft fabric mold 300. A pressure gauge 308 may be used, for example, to monitor and facilitate control of the pressure applied to the resin underneath the fabric mold 300. A temperature gauge 309 may monitor the heat exotherm temperature of the resin, for example, during curing.

FIGS. 22E and 22E' depict the installation of the tambour 180 over the mold 300. The male coupling 192 and female coupling 202 are engaged to secure the tambour to the pipe 270. The funnel 304 and any associated instrumentation (e.g., pressure gauge 308) of the mold 300 are inserted through the opening 194 of the tambour 180. FIGS. 22F and 22F' depict the introduction of resin 320 through the funnel 304 of the pliable mold 300 to the interior of the mold 300. The resin 320 may be of a predetermined amount of mixed ESR resin and hardener, for example. The resin flows under the mold 300 around the carbon cloth 290. The flow characteristics of the resin 320 may be affected by the viscosity of the resin 320. In one embodiment, the viscosity of the resin 320 is in the range of 1200 to 1500 centipoise (cP). This is in contrast to other typical resins which may be of a much higher viscosity.

FIGS. 22G and 22G' illustrate the technique of pressurizing the resin 320 through the fiber cloth 290 to the surface of the pipe 270, substantially saturating the fiber cloth 290. In an implementation, a dowel, for example, such as a wood dowel 330 may be utilized at the top of the soft mold through holes provided on the funnel 304 to twist or squeeze the mold 300 to apply pressure to the resin 290. In certain embodiments, the pressure on the resin 320 may be increased to 5 pounds per square inch (psi) and greater, and maintained until the resin 320 hardens.

Again, such pressure may be monitored by a pressure gauge 308, a pressure transducer, or other pressure measuring means. Thus, the resin 320 is hydraulically pressurized underneath and around the inner surface of the mold 300, substantially saturating and encapsulating the inner tambour 180 and both layers of reinforcing fabric 284 and 290. The outer tambour 300 may facilitate control of the resin thickness distribution, reduce resin consumption, increase resin pressure capability, and so forth.

FIGS. 22H and 22H' depict the pipe 270 after the resin 320 has hardened, and the tambour 180 and soft mold 300 have been removed to expose the resin 320. The resin may form a composite with the fiber structure. The repair may reinforce the pipe, reestablish the pressure rating of the pipe, mitigate stress crack corrosion, and the like.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method of reinforcing a portion of a pipe, comprising:
    applying a fiber structure without resin to the portion of the pipe to be reinforced;
    installing a fabric mold around the fiber structure;
    installing a reinforcing containment around the fabric mold;
    pouring resin through the reinforcing containment and into the fabric mold on top of the fiber structure; and
    compressing the fabric mold to pressure the resin through the fiber structure to the pipe.

2. The method as recited in claim 1, wherein compressing the fabric mold substantially saturates the fiber structure with the resin.

3. The method as recited in claim 1, wherein the reinforcing containment supports the fabric mold.

4. The method as recited in claim 1, wherein the reinforcing containment forms an annulus with the pipe.

5. The method as recited in claim 1, wherein the reinforcing containment facilitates control of a thickness of the resin around the pipe.

6. The method as recited in claim 1, wherein the reinforcing containment is flexible in the radial direction and provides stiffness in the axial direction.

7. The method as recited in claim 1, wherein pouring resin comprises pouring resin through an opening of the reinforcing containment and through an opening of the fabric mold.

8. The method as recited in claim 7, wherein the opening of the fabric mold comprises a funnel.

9. A method of reinforcing a portion of a pipe, comprising:
    applying a fiber structure without resin to the portion of the pipe to be reinforced;
    installing a mold around the fiber structure;
    installing a tambour around the mold;
    pouring resin through the tambour and into the mold on top of the fiber structure; and
    compressing the mold to pressure the resin through the fiber structure to the pipe.

10. The method as recited in claim 1, comprising installing a pressure gauge to measure pressure of the resin under the fabric mold.

11. The method as recited in claim 1, comprising installing a temperature gauge to measure temperature of the resin under the fabric mold.

12. A method of reinforcing an object, comprising:
    applying a fiber structure to a surface of the object;
    installing a fabric mold around the applied fiber structure,
    positioning a tambour around the fabric mold;
    disposing a polymeric material inside the fabric mold and pressurizing the resin into the fiber structure to substantially saturate the fiber structure; and
    permitting the polymeric material to cure to form a composite of the fiber structure and the polymeric material on the surface of the object.

13. The method as recited in claim 12, wherein the object comprises a vessel, a pipe, a nozzle, or any combination thereof.

14. The method as recited in claim 12, wherein applying the fiber structure comprises wrapping the fiber structure around an outer surface of the object.

15. The method as recited in claim 12, wherein the fiber structure is not impregnated with polymeric material prior to or while applying the fiber structure to the object.

16. The method as recited in claim 12, wherein the tambour comprises a plurality of extrusion slats.

17. The method as recited in claim 12, comprising measuring pressure inside the fabric mold.

18. The method as recited in claim 12, comprising measuring the exotherm temperature of the polymeric material inside the fabric mold during curing of the polymeric material.

19. A system for repairing a pipe, comprising:
    a reinforcing material configured to wrap around the pipe and to receive a resin after installation of the reinforcing material around the pipe;
    a fabric mold configured to be disposed about the reinforcing material wrapped around the pipe, wherein the fabric mold is configured to receive and hold the resin around the reinforcing material;

a support structure configured to encase and support at least a portion of the fabric mold disposed on the pipe; and the resin formulated to be poured through the support structure and inside the fabric mold to penetrate the fiber and to form a composite with the reinforcing material on the pipe.

20. The system as recited in claim 19, wherein the reinforcing material comprises a fiber structure.

21. The system as recited in claim 19, wherein the fiber structure comprises carbon fibers.

22. The system as recited in claim 19, wherein the resin comprises an epoxy system, a polyester system, a vinyl ester system, a urethane system, or a methacrylate system, or any combination thereof.

23. The system as recited in claim 19, wherein the fabric mold is configured to be compressed to pressurize the resin to through the reinforcing material to the pipe to substantially saturate the reinforcing material with the resin.

24. The system as recited in claim 19, wherein the fabric mold comprises a funnel to receive the resin.

25. A system for repairing a pipe, comprising:

a reinforcing material configured to wrap around the pipe and to receive a resin after installation of the reinforcing material around the pipe;

a mold configured to be disposed about the reinforcing material wrapped around the pipe, wherein the mold is configured to receive and hold the resin around the reinforcing material;

a support structure configured to encase and support at least a portion of the mold disposed on the pipe; and the resin formulated to be poured inside the mold to penetrate the fiber and to form a composite with the reinforcing material on the pipe, wherein the support structure comprises a rigid shell that forms an annulus with the pipe.

26. A system for repairing a pipe, comprising:

a reinforcing material configured to wrap around the pipe and to receive a resin after installation of the reinforcing material around the pipe;

a mold configured to be disposed about the reinforcing material wrapped around the pipe, wherein the mold is configured to receive and hold the resin around the reinforcing material;

a support structure configured to encase and support at least a portion of the mold disposed on the pipe; and the resin formulated to be poured inside the mold to penetrate the fiber and to form a composite with the reinforcing material on the pipe, wherein the support structure is flexible in the radial direction and provides stiffness in the axial direction.

27. The system as recited in claim 19, wherein the support structure comprises a sheet of metal.

28. The system as recited in claim 19, wherein the support structure comprises a tambour having a plurality of flexible members providing stiffness in the axial direction.

29. The system as recited in claim 19, comprising a temperature gauge configured to measure a temperature of the resin during curing of the resin.

30. The system as recited in claim 19, comprising a pressure gauge configured to measure the pressure of the resin disposed on the reinforcing material under the fabric mold.

* * * * *